(12) United States Patent
Iwago et al.

(10) Patent No.: US 6,386,427 B2
(45) Date of Patent: May 14, 2002

(54) ONE-SIDE WELDING METHOD FOR STEEL STRUCTURE

(75) Inventors: Shunji Iwago, Tosa; Masayoshi Uchida, Kochi, both of (JP)

(73) Assignee: Machida Steel Structure Corporation, Tosa (JP)

( * ) Notice: Subject to any disclaimer, the term of this patent is extended or adjusted under 35 U.S.C. 154(b) by 0 days.

(21) Appl. No.: 09/755,026

(22) Filed: Jan. 8, 2001

(30) Foreign Application Priority Data

Jan. 12, 2000 (JP) .................................... 2000-003782
Jul. 4, 2000 (JP) .................................... 2000-202582
Nov. 29, 2000 (JP) .................................... 2000-363495

(51) Int. Cl.[7] ............................................. B23K 35/02
(52) U.S. Cl. ....................... 228/164; 228/137; 228/161; 403/272; 219/61
(58) Field of Search .................. 228/164, 137, 228/167; 219/61, 60 R, 137 R, 137 WM; 403/270, 271, 272

(56) References Cited

U.S. PATENT DOCUMENTS

| | | | |
|---|---|---|---|
| 1,161,419 A | * 11/1915 | Slick | 219/137 R |
| 4,412,122 A | * 10/1983 | Bohm et al. | 219/137 R |
| 5,159,175 A | * 10/1992 | Loeber | 219/137 R |
| 5,171,958 A | * 12/1992 | Yamaguchi et al. | 219/137 WM |
| 5,258,600 A | * 11/1993 | Arthur | 219/137 R |
| 5,479,704 A | * 1/1996 | Richter et al. | 228/119 |
| 5,914,055 A | * 6/1999 | Roberts et al. | 219/137 WM |
| 5,921,591 A | * 7/1999 | Argent | 228/135 |

OTHER PUBLICATIONS

Japanese Architectural Standard Specification JASS6 dated Feb. 20, 1997.
Recommendation for Quality Criteria and Inspection Standards of Steel Structures dated Jul. 1, 1998.

* cited by examiner

Primary Examiner—Tom Dunn
Assistant Examiner—Jonathan Johnson
(74) Attorney, Agent, or Firm—Armstrong, Westerman & Hattori, LLP

(57) ABSTRACT

In the present invention, by the method using a backing material such as copper, which is not melted by a welding heat source, in an end face of a member without using a backing metal or consumable backing material at a joint welding time, overlay welding is performed to increase a plate thickness and a plate width. Thereafter, edge preparation including a member of a designed joint weld location and an overlay weld is performed, and the groove processed portion is placed to an opponent member to provide joint welding in order to obtain an effective throat depth more than a plate thickness and a plate width of the member.

10 Claims, 32 Drawing Sheets

[Fig. 1]
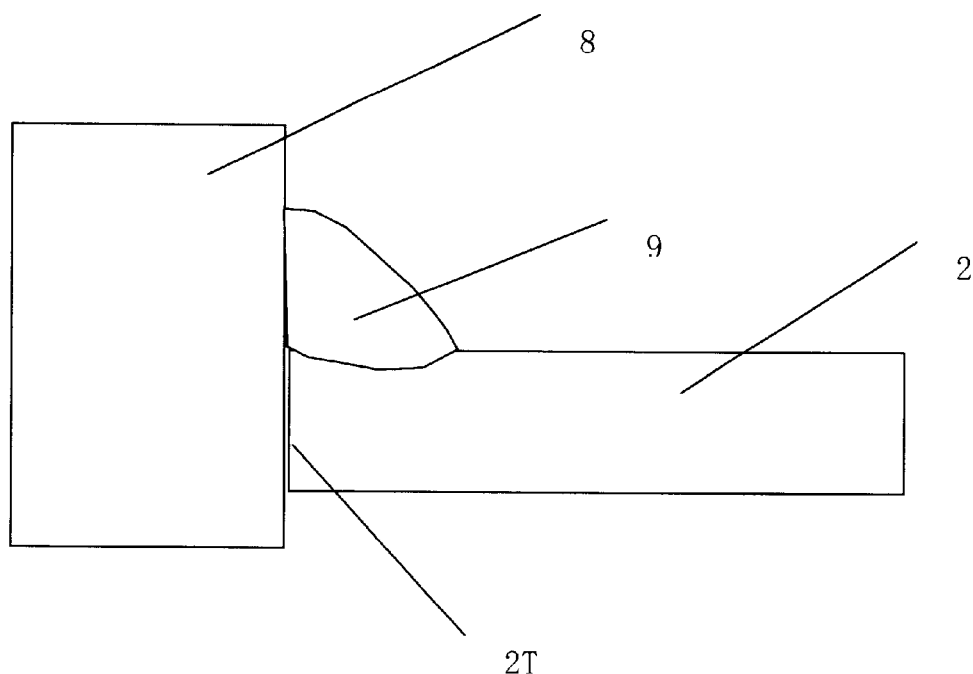
[Fig. 2]
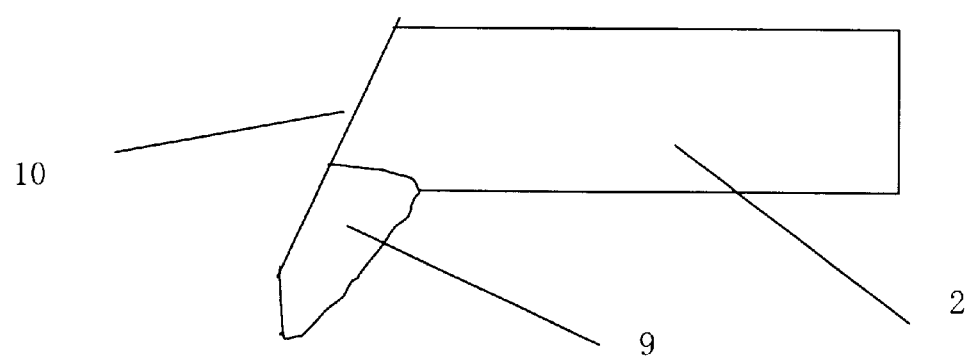

【Fig. 3】
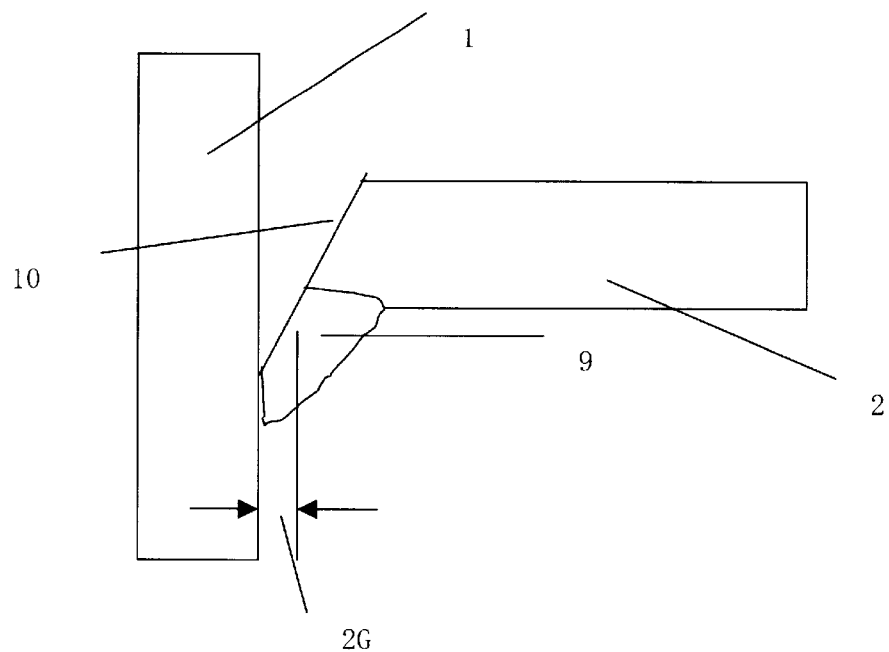
【Fig. 4】
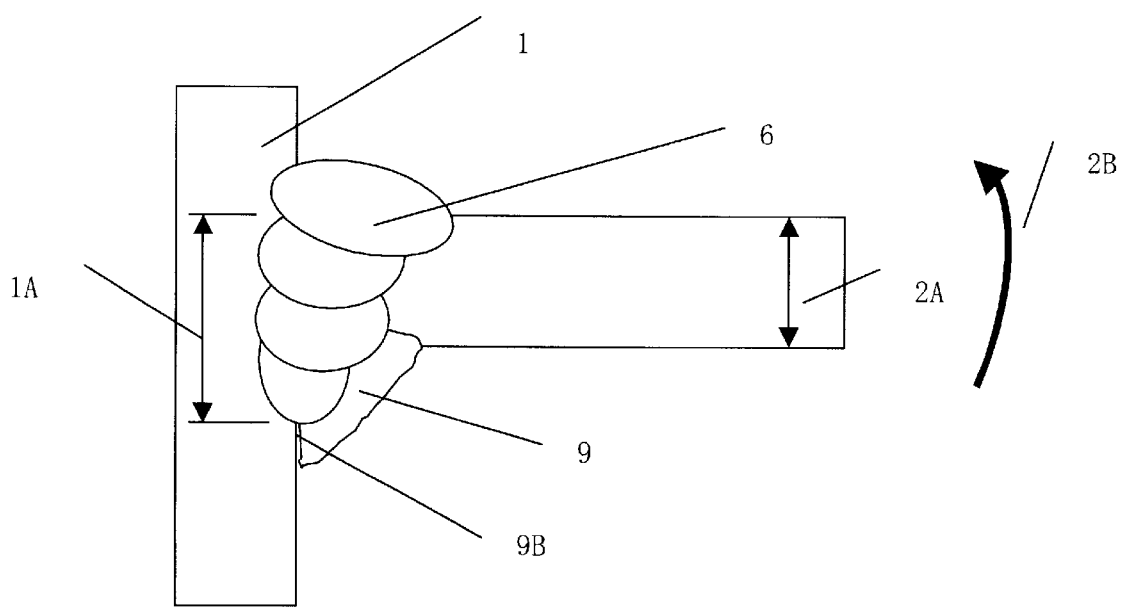

[Fig. 5]
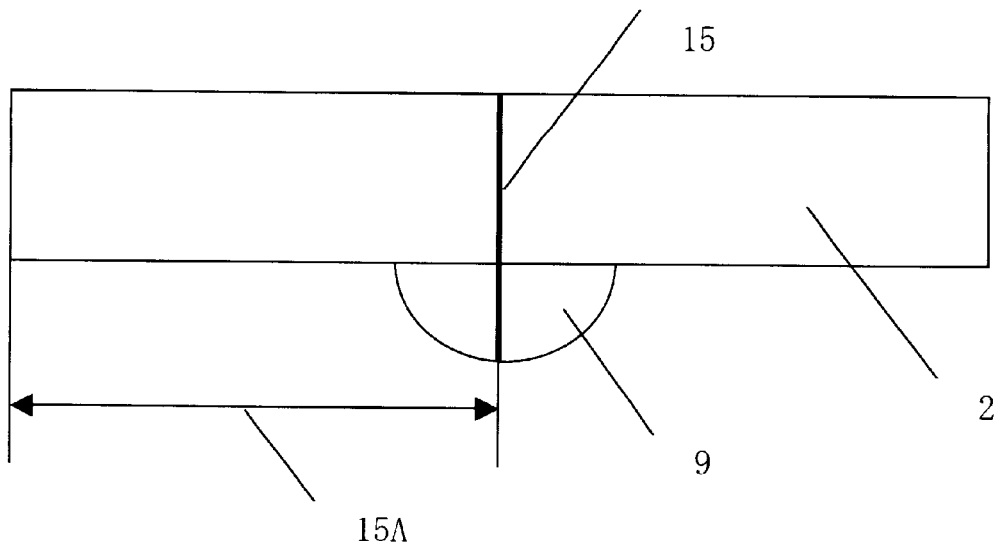
[Fig. 6]
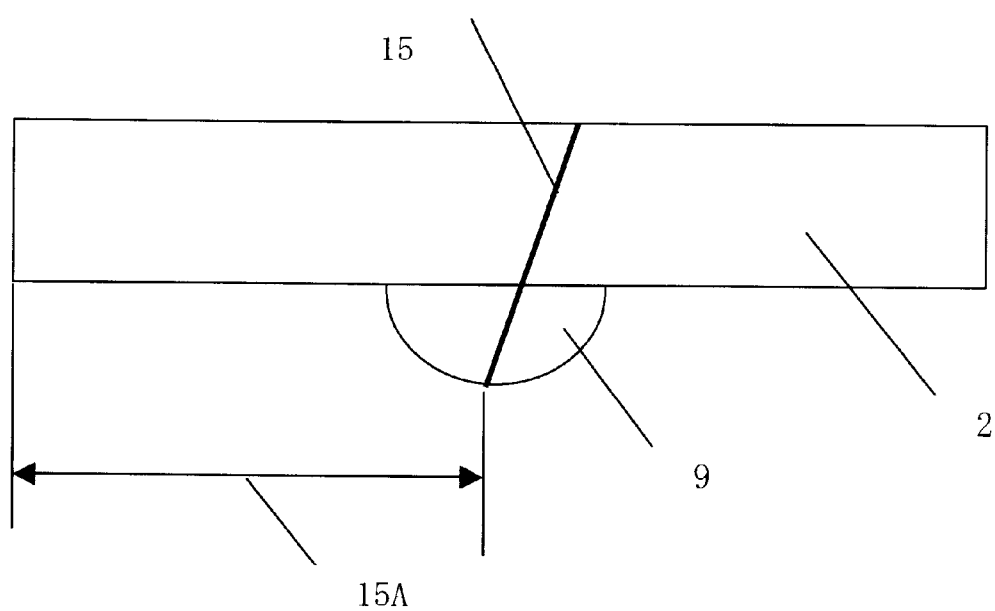

[Fig. 7]
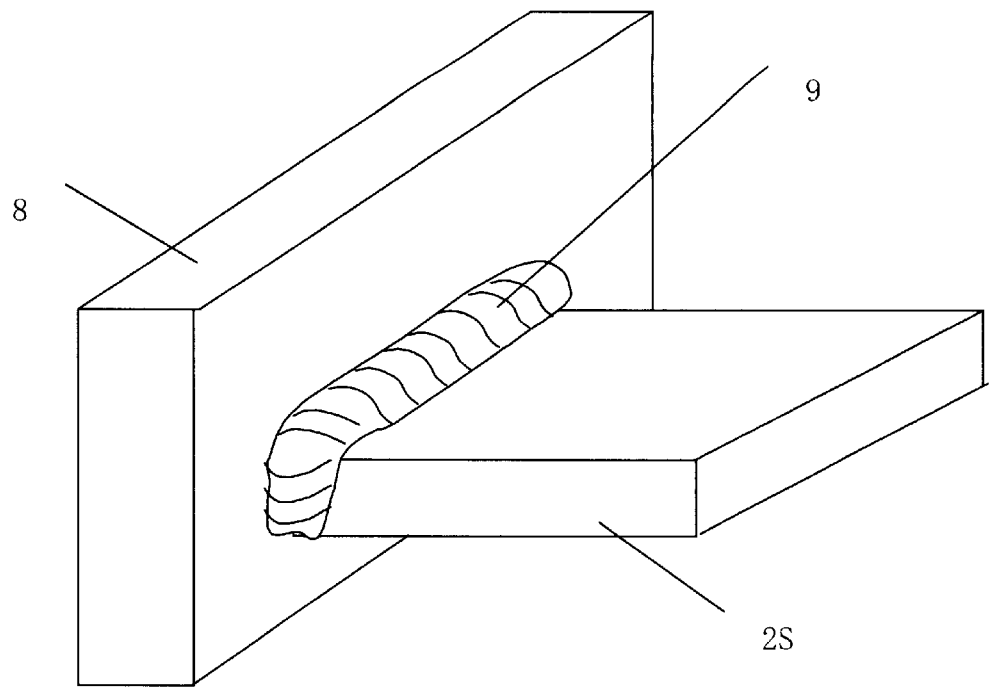
[Fig. 8]
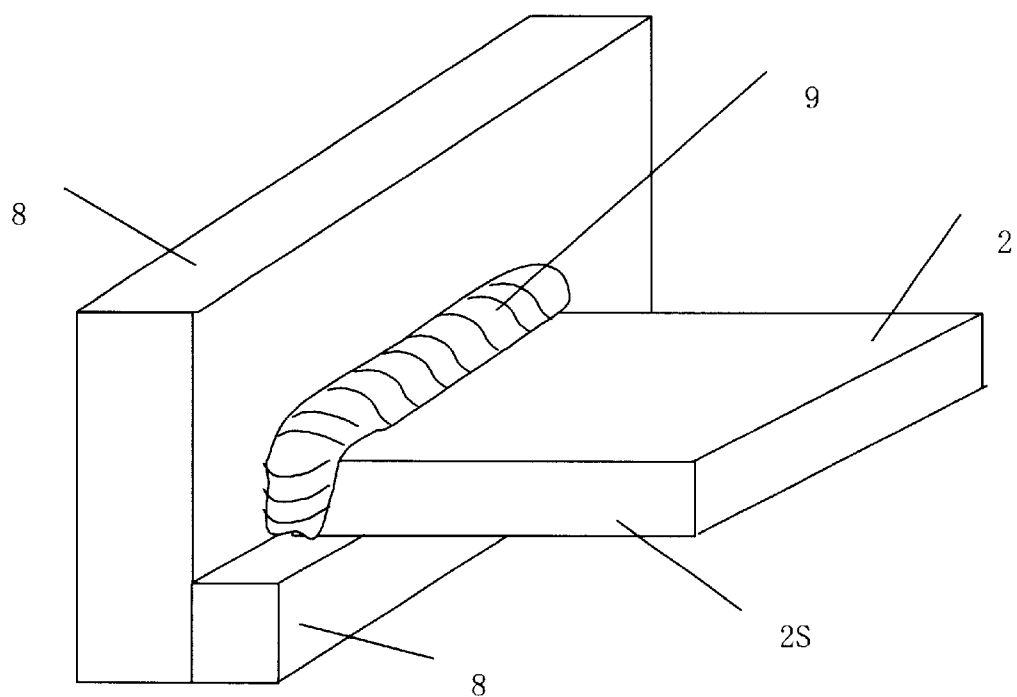

[Fig. 9]
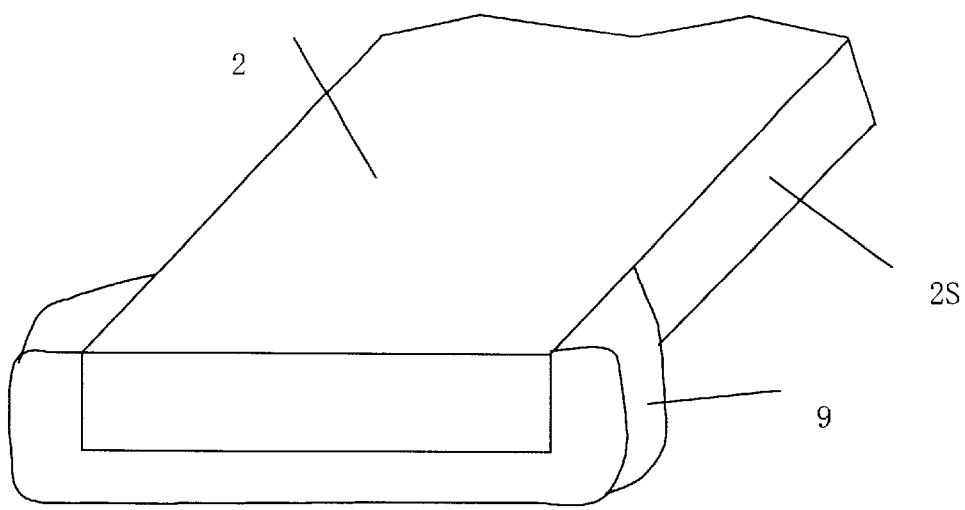
[Fig. 10]
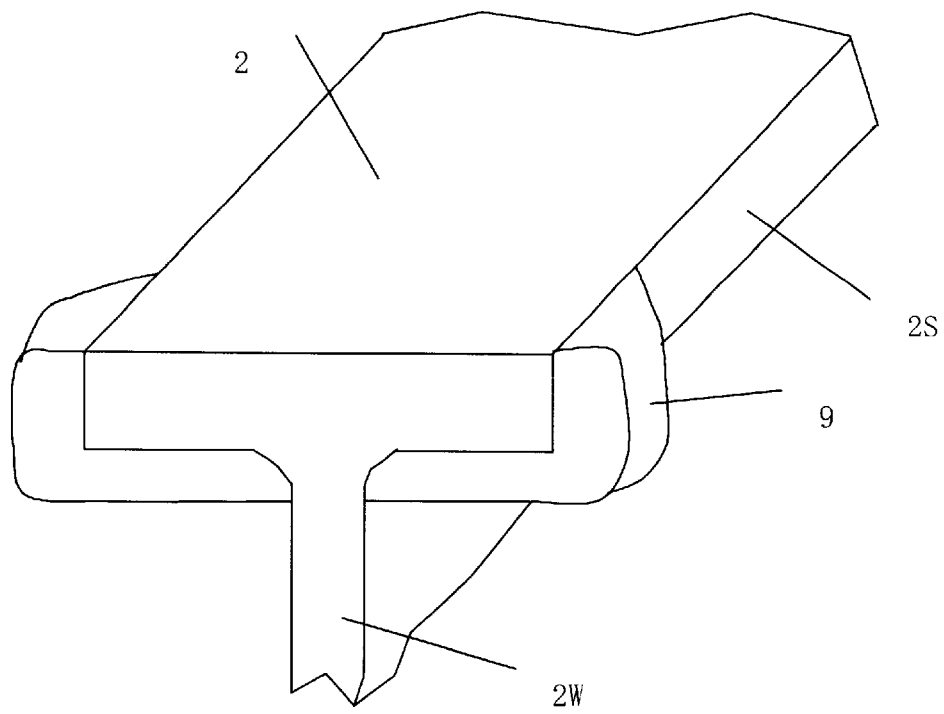

[Fig. 11]
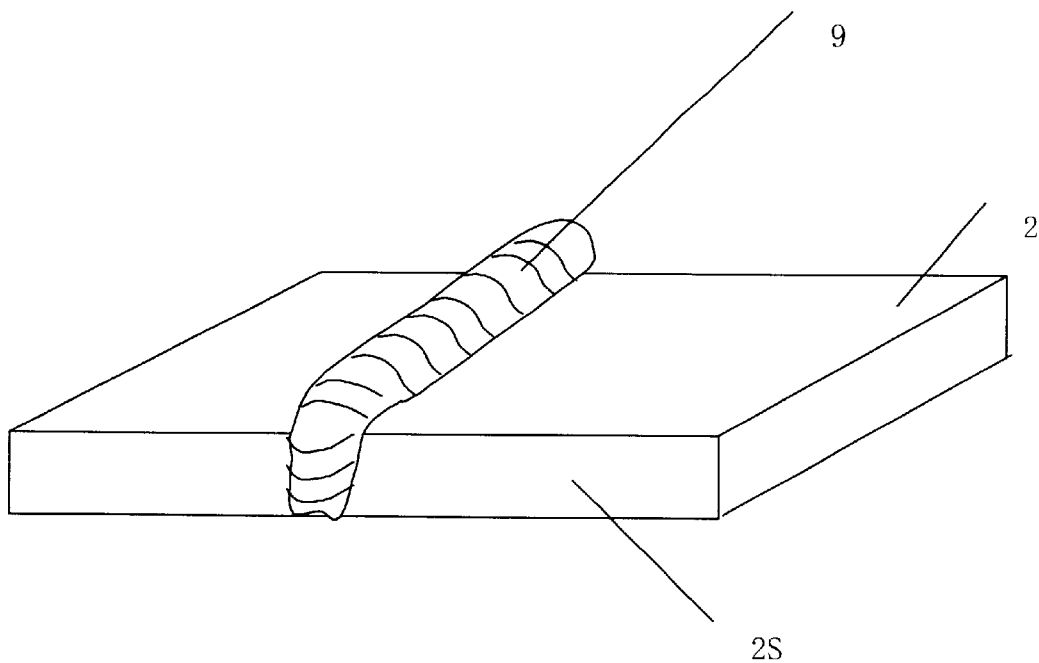
[Fig. 12]
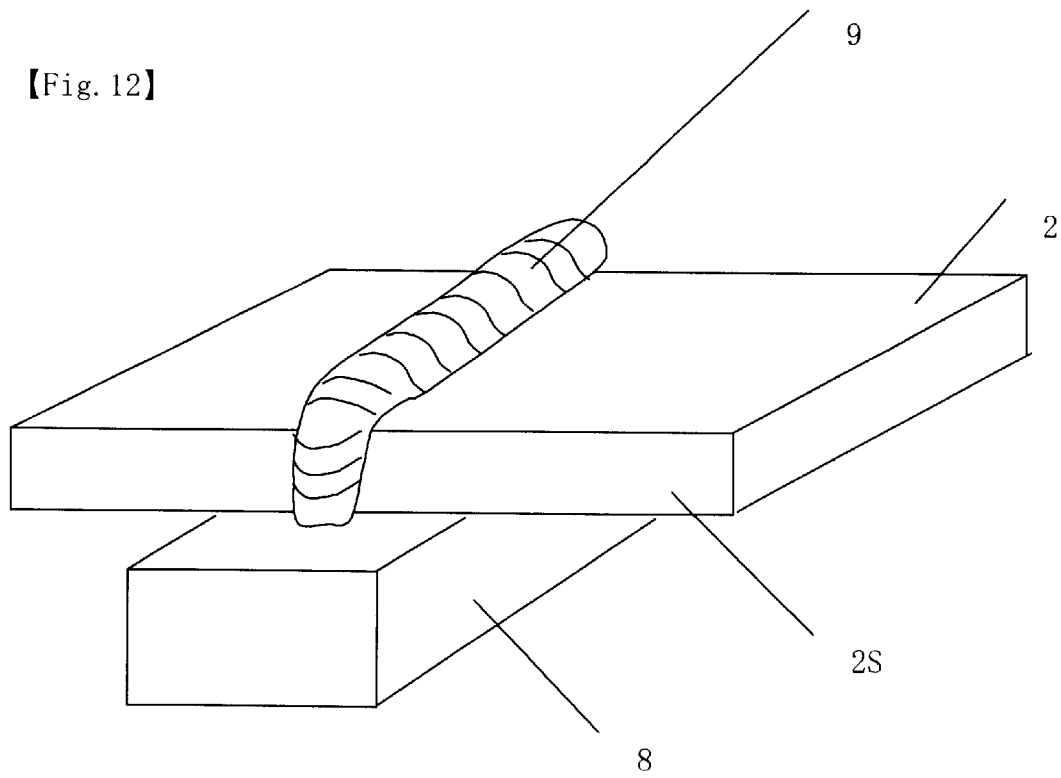

[Fig. 13]
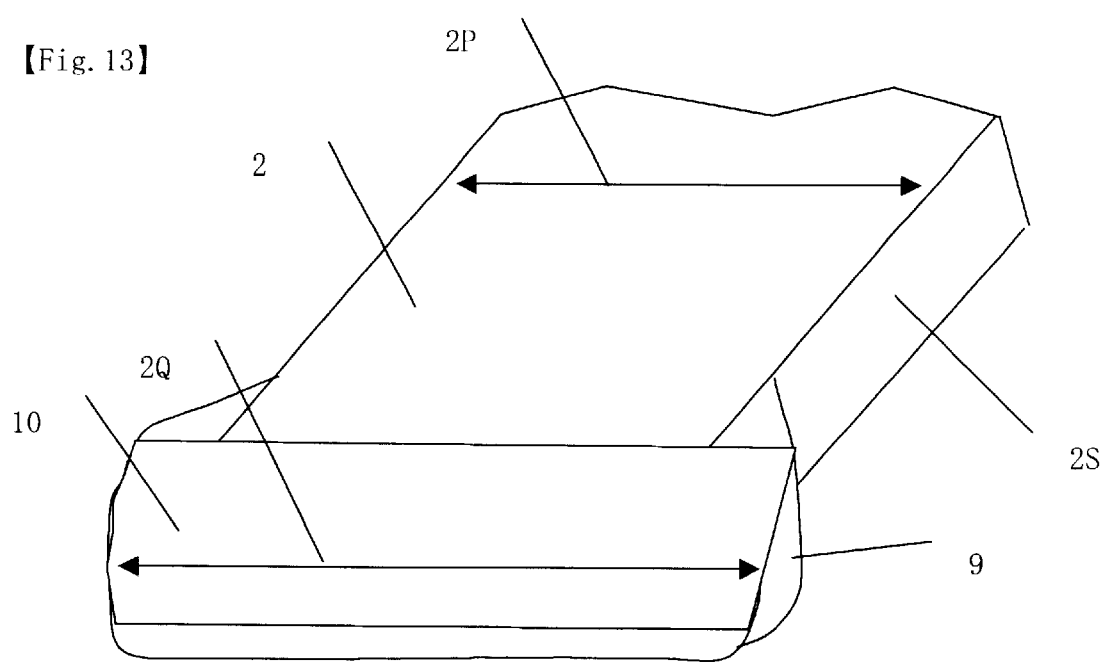
[Fig. 14]
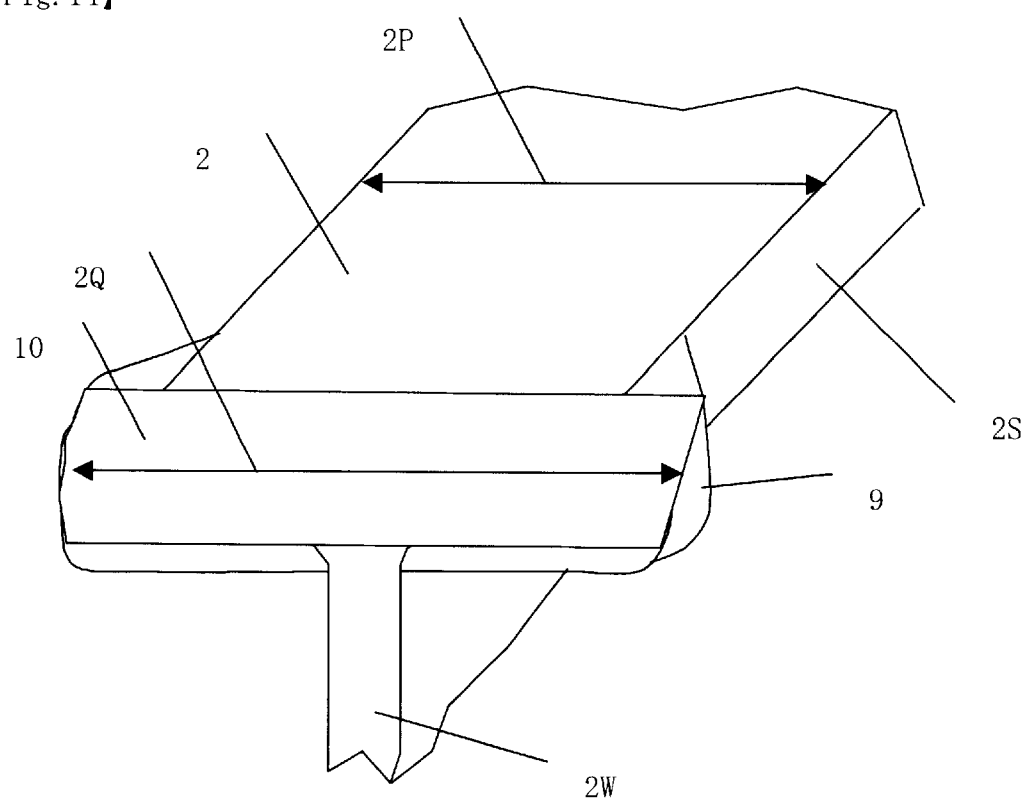

[Fig. 15]
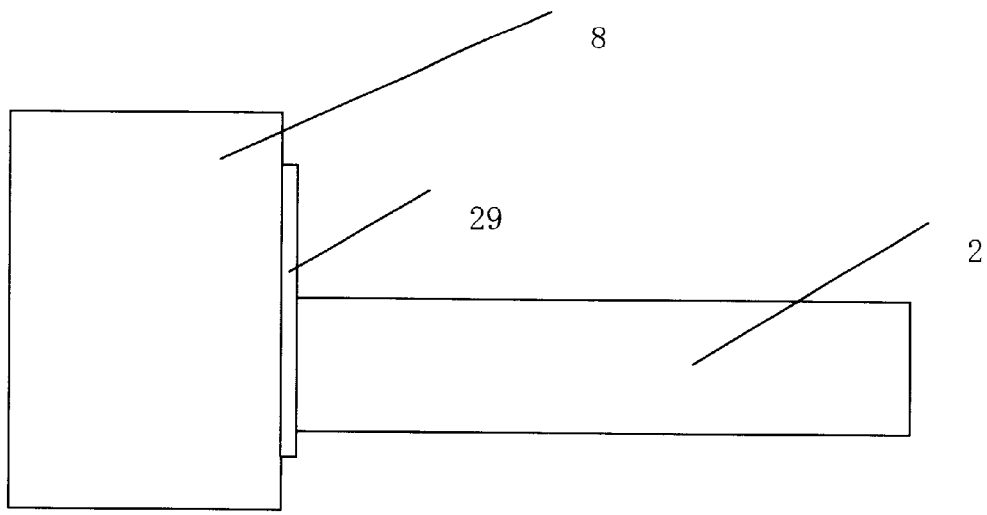
[Fig. 16]
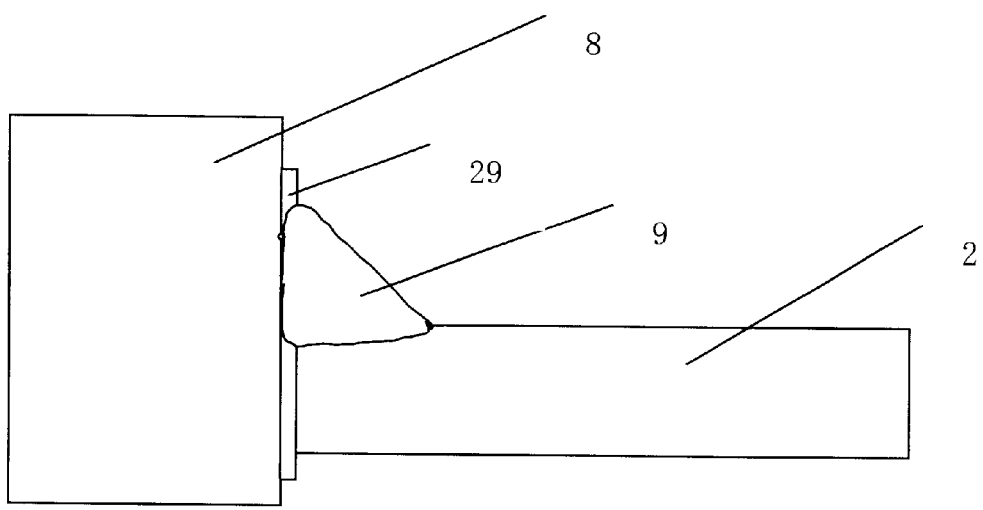

[Fig. 16A]
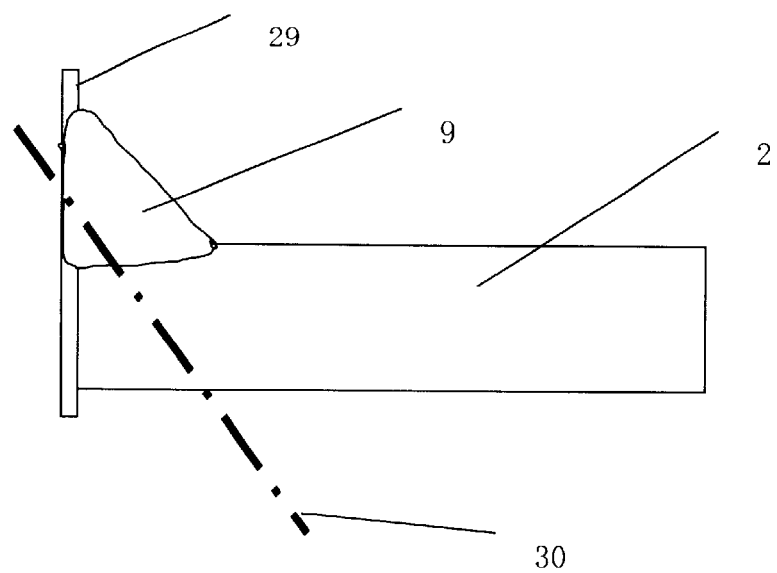
[Fig. 16B]
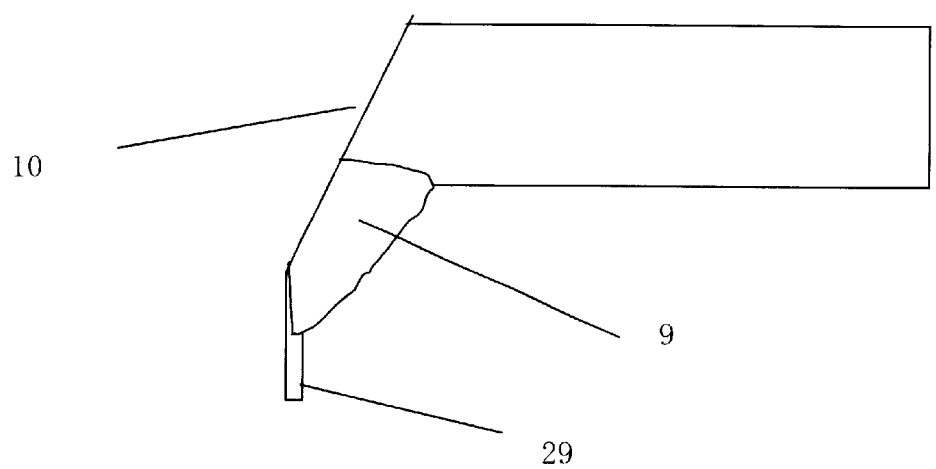

[Fig. 17]
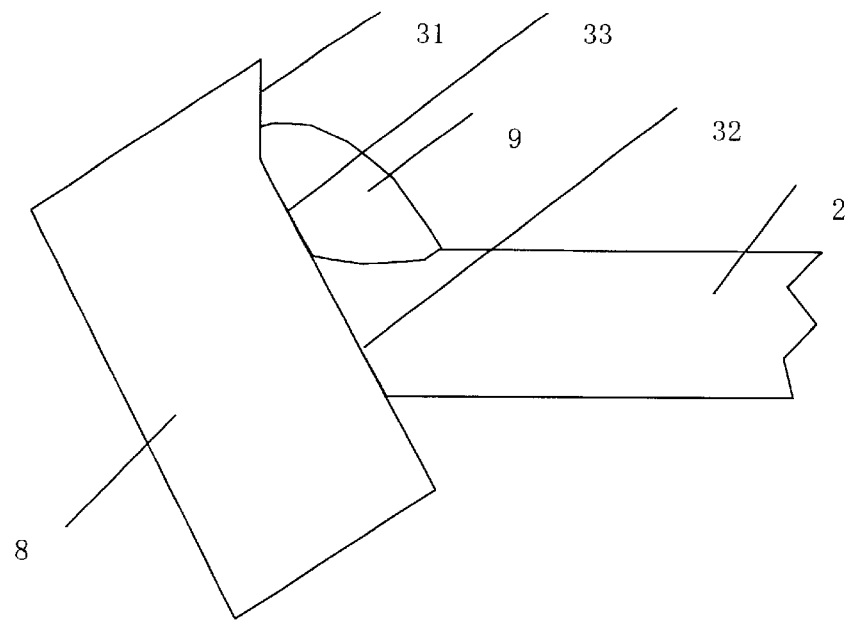
[Fig. 18]
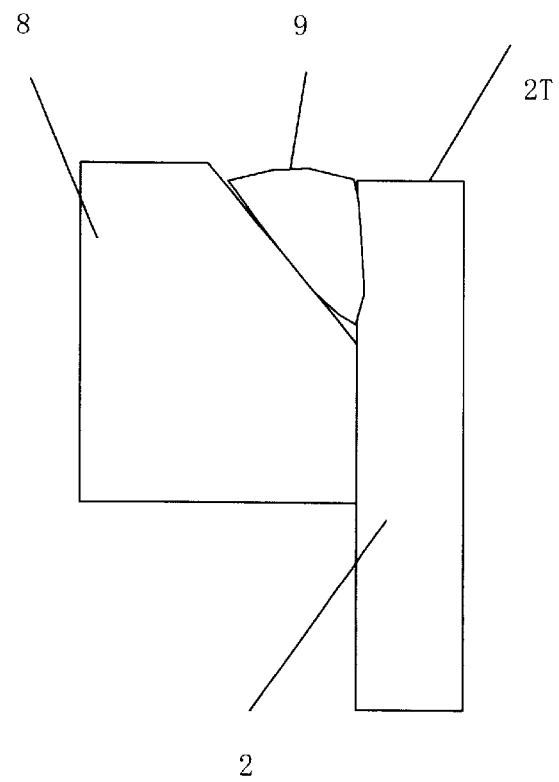

[Fig. 19]
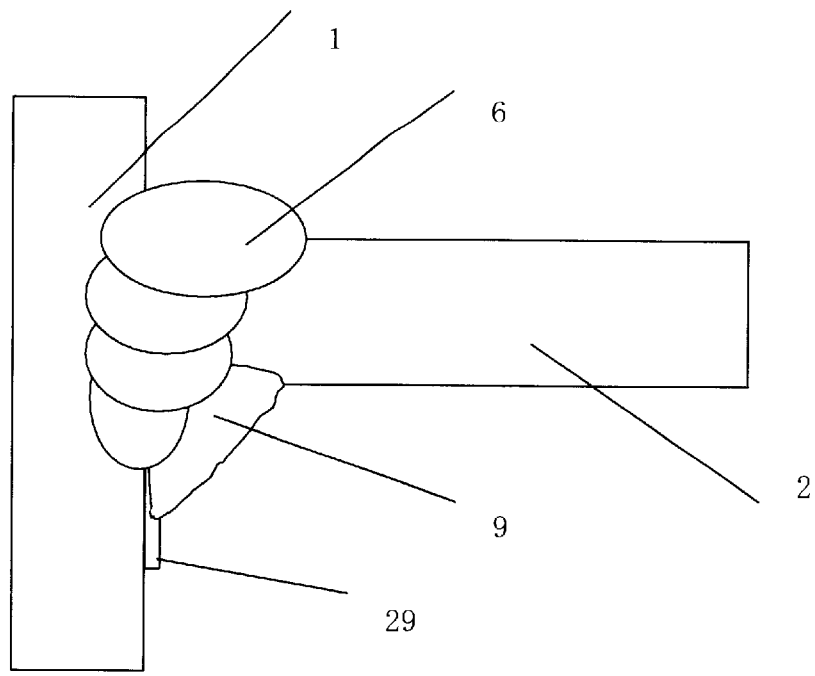
[Fig. 19A]
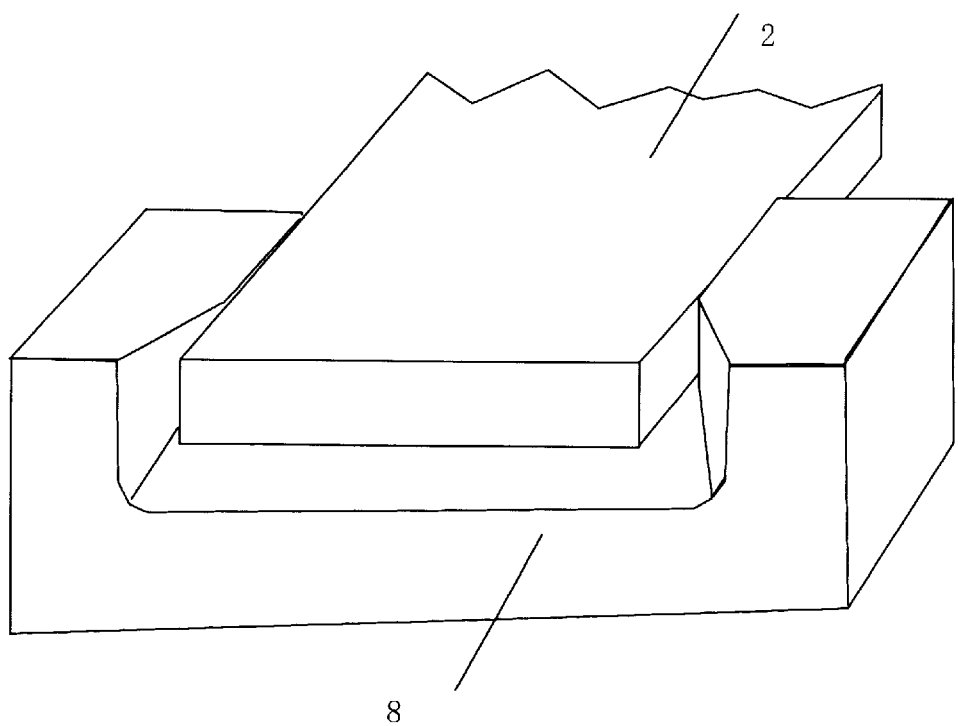

[Fig. 20]
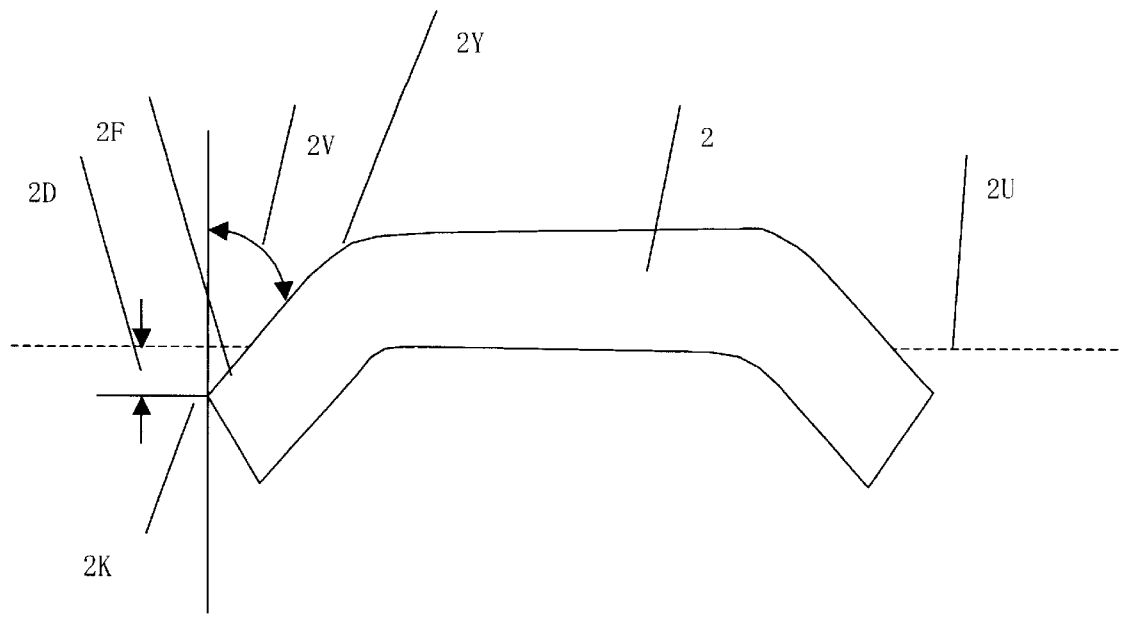
[Fig. 21]
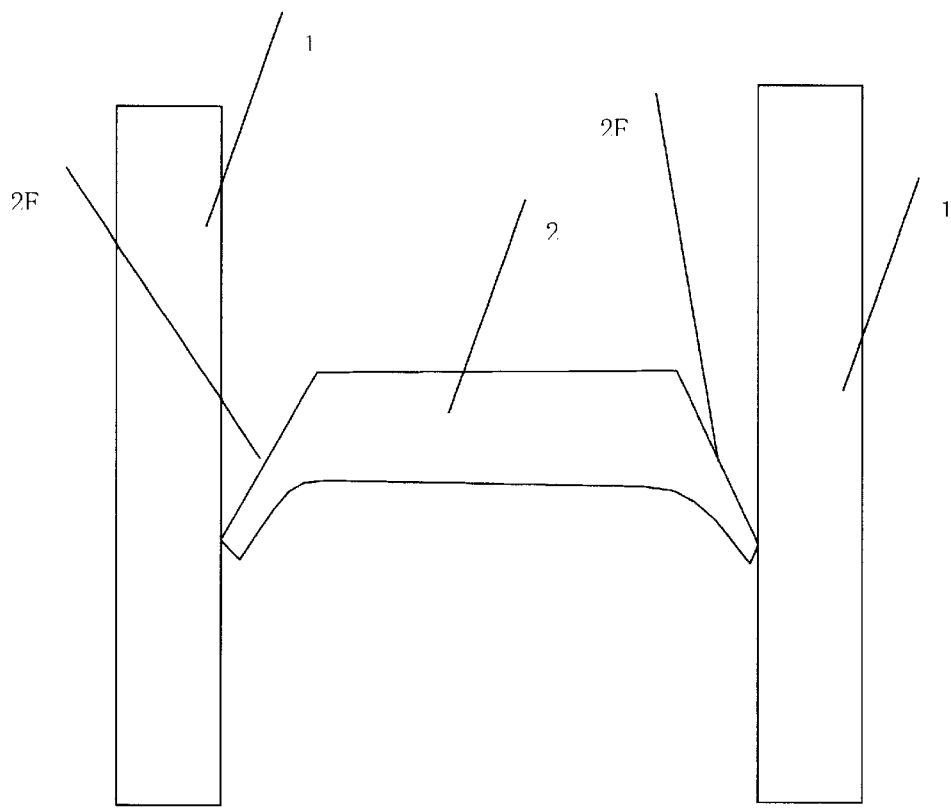

[Fig. 22]
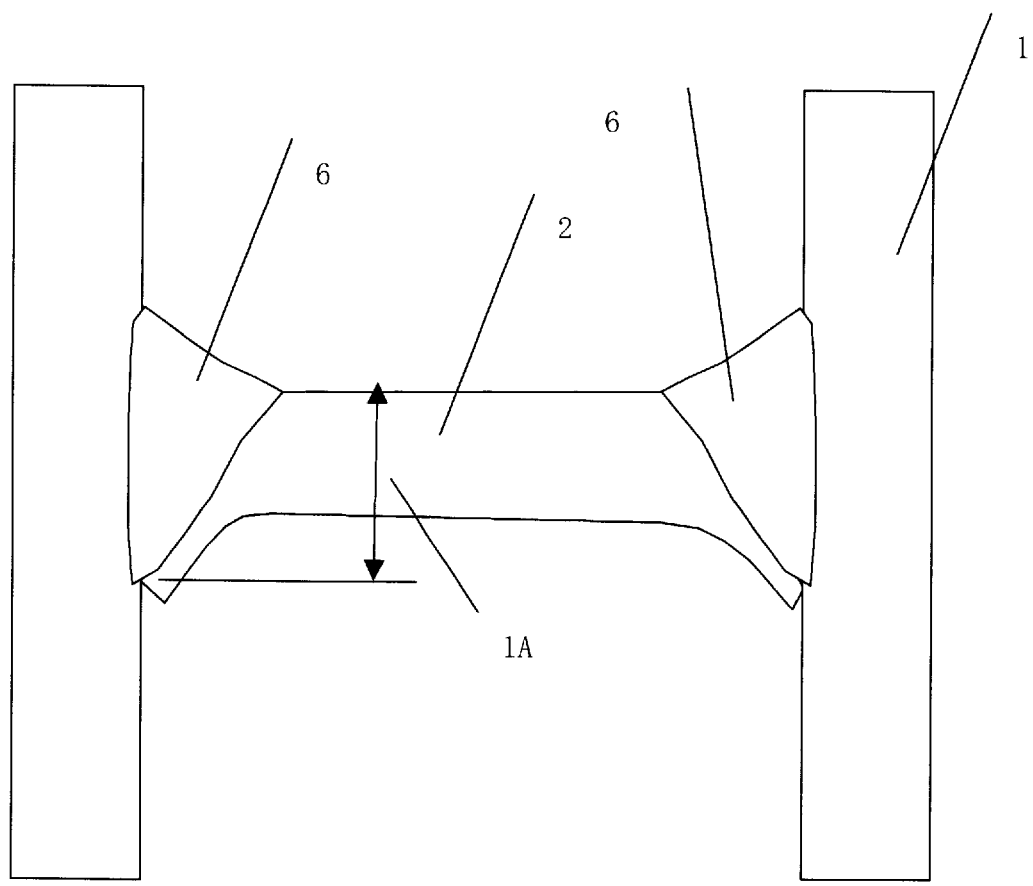

[Fig. 23]
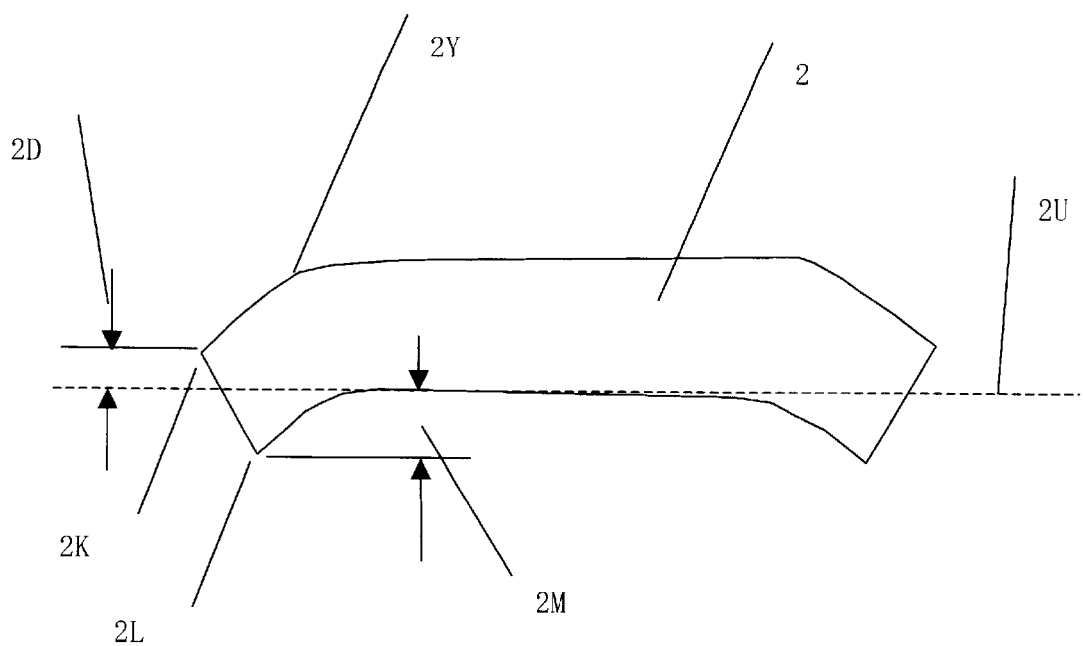
[Fig. 24]
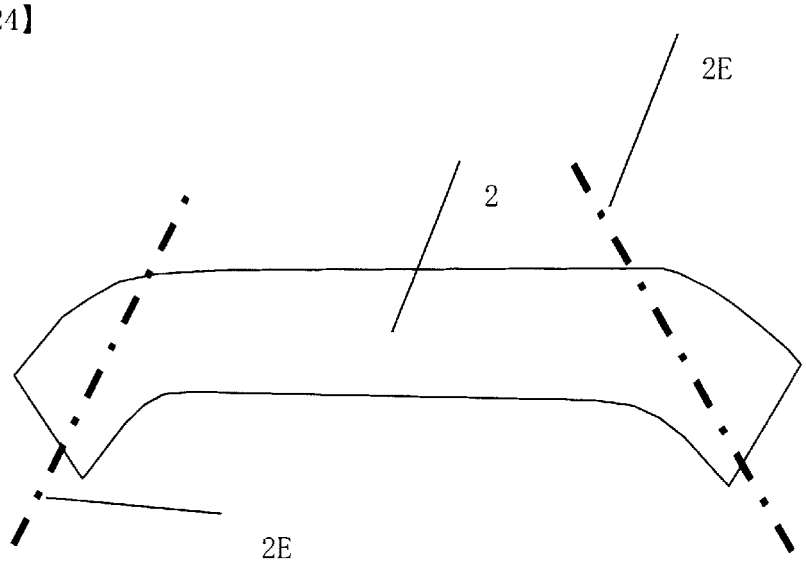

[Fig. 25]
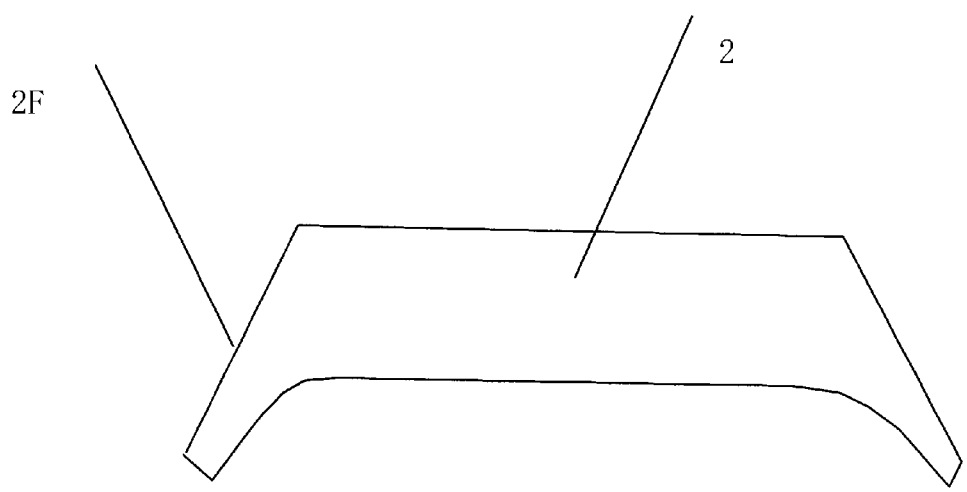

[Fig. 26]
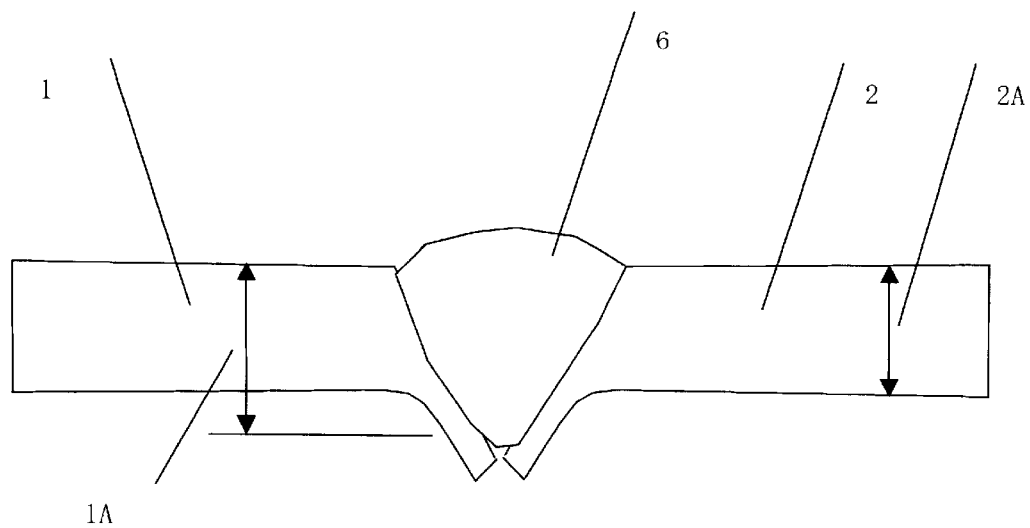
[Fig. 27]
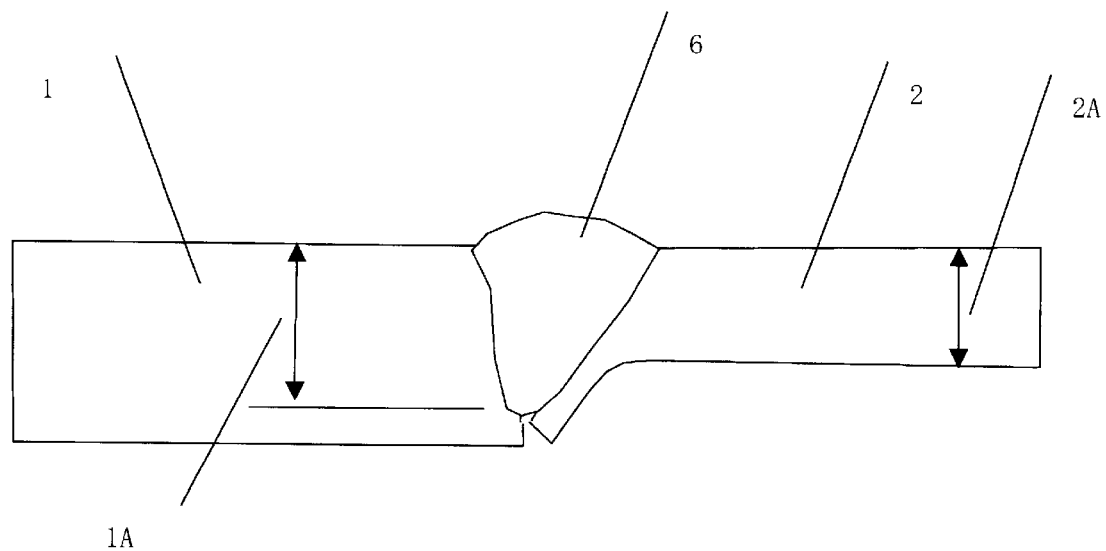

[Fig. 28]
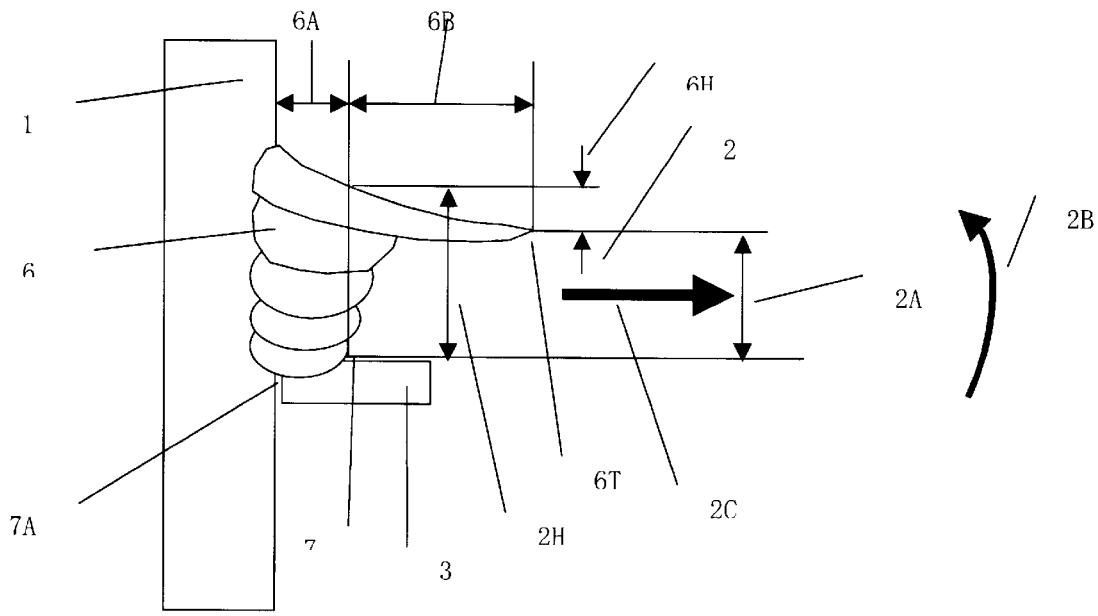
[Fig. 29]
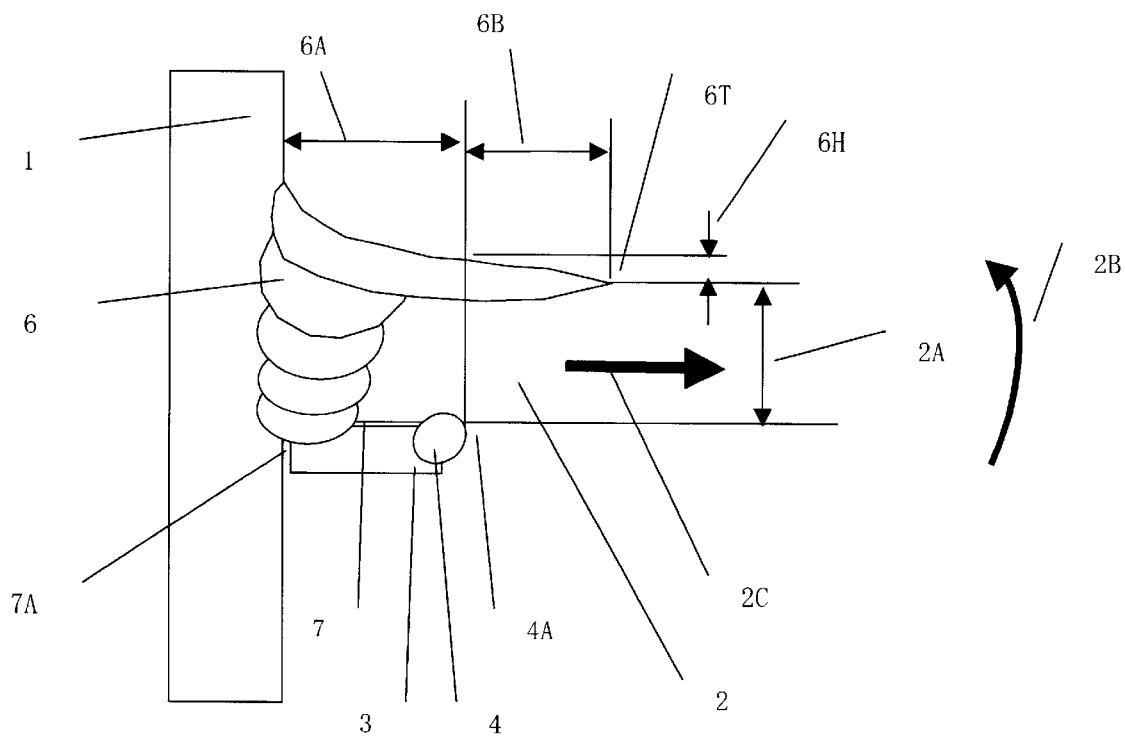

[Fig. 30]
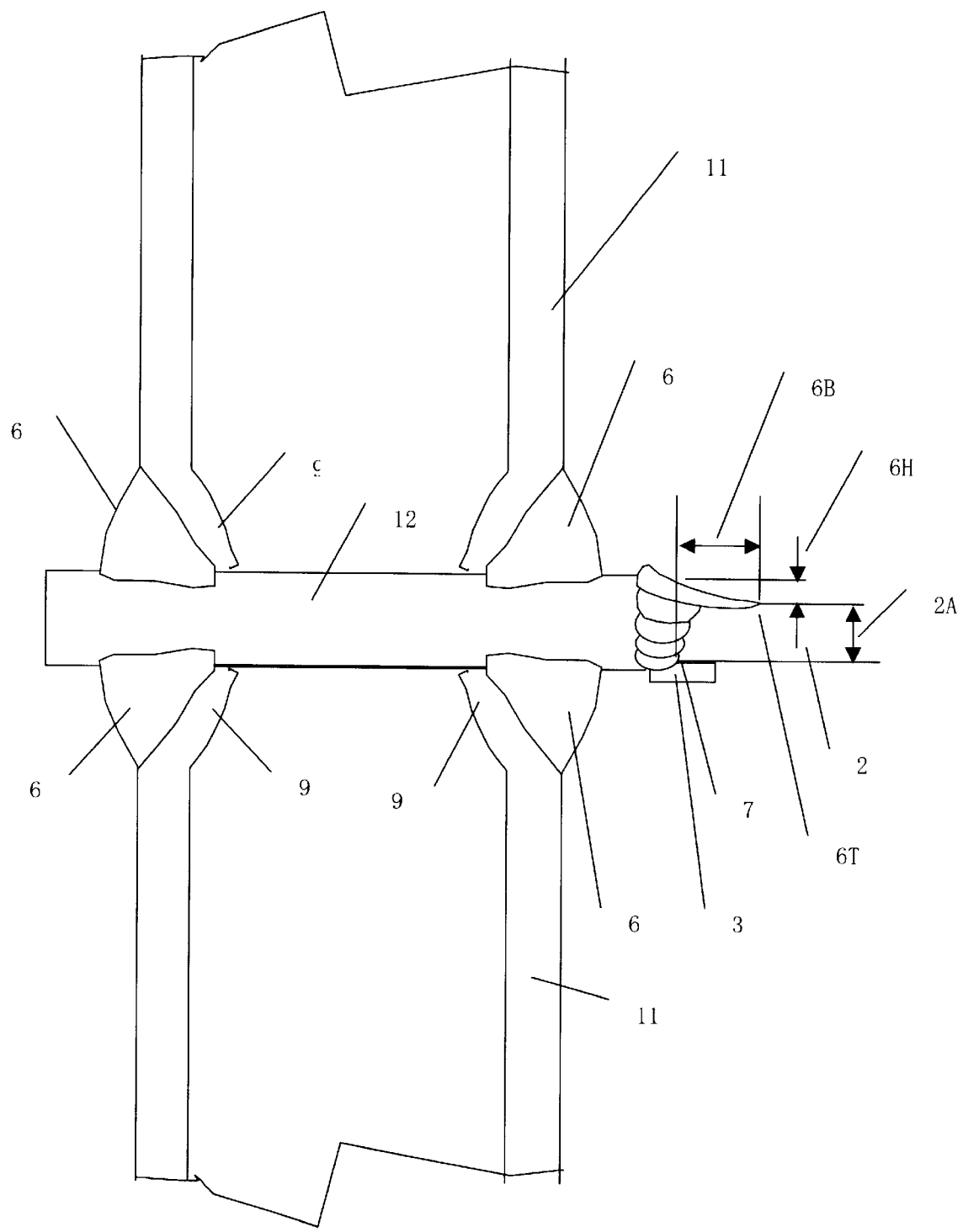

【Fig. 31】
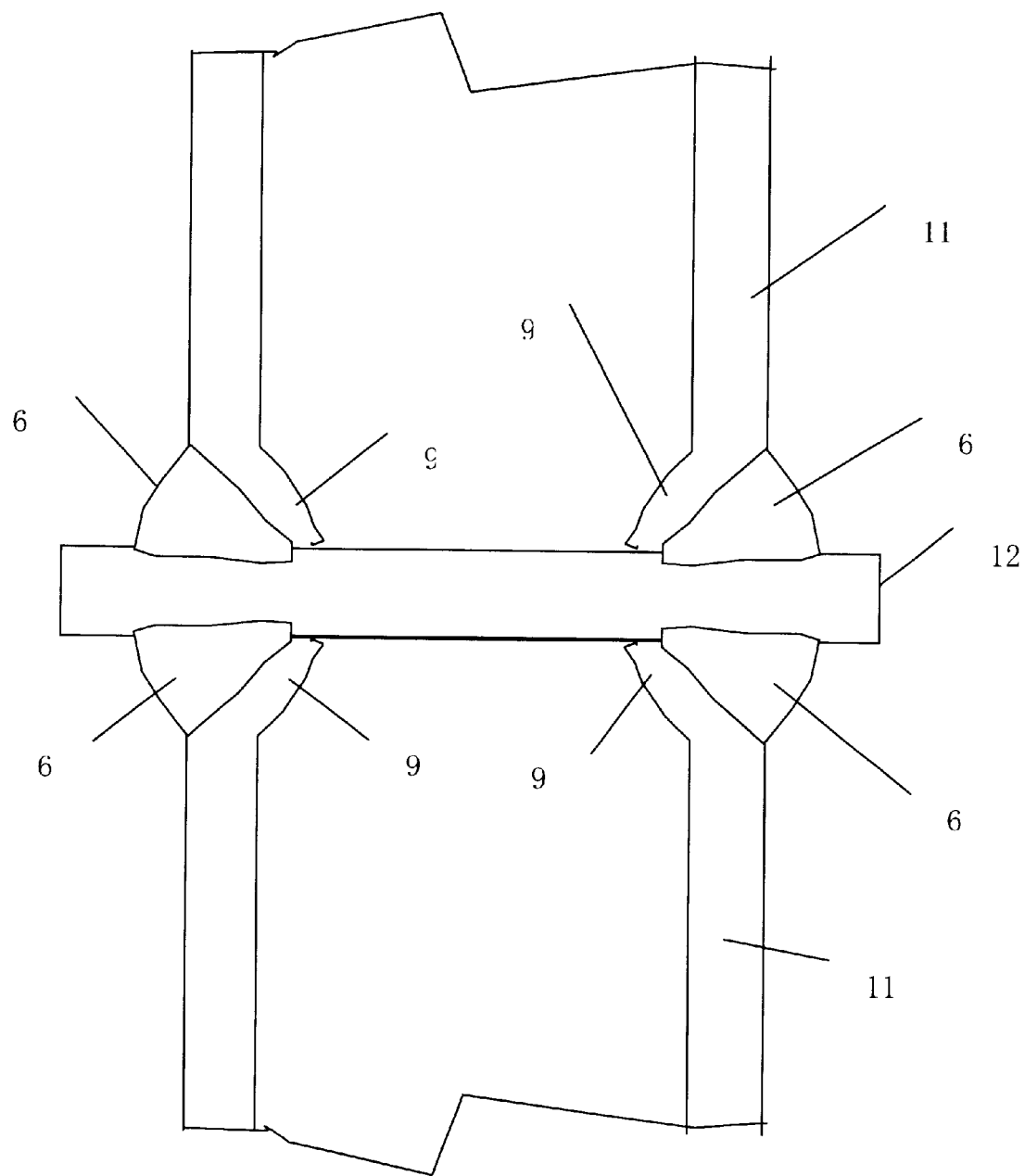

[Fig. 32]
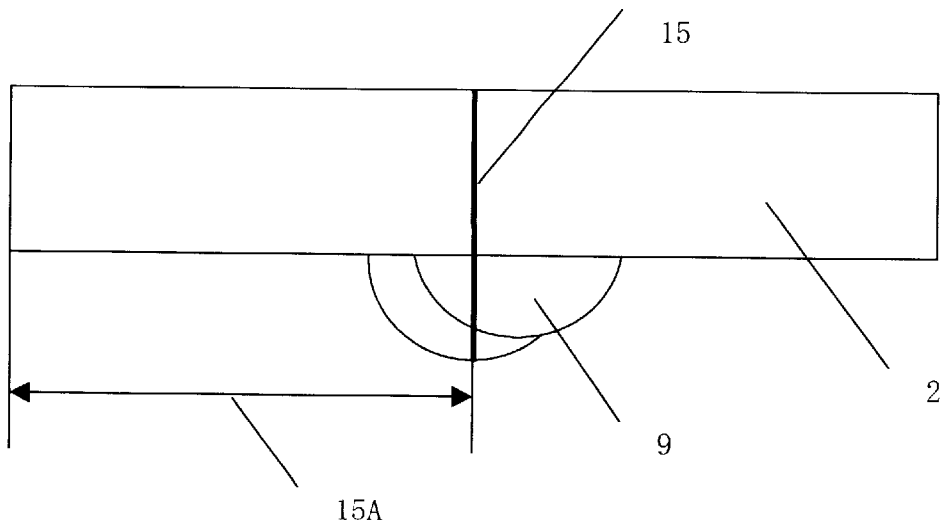
[Fig. 33]
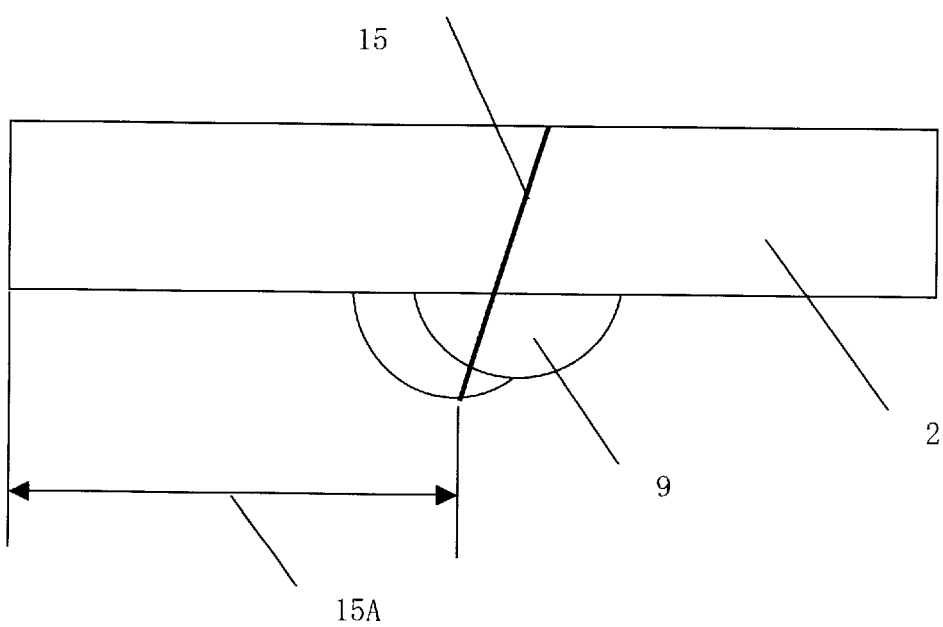

[Fig. 34]
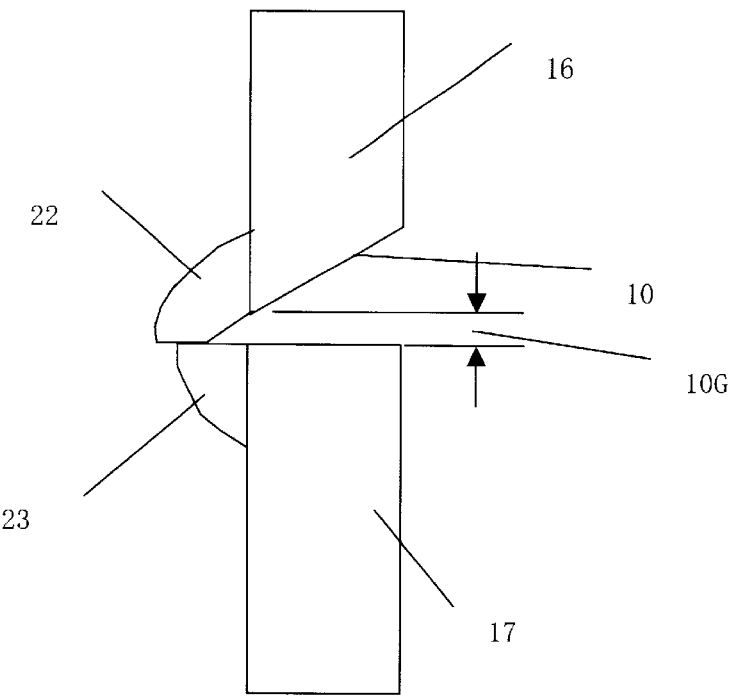
[Fig. 35]
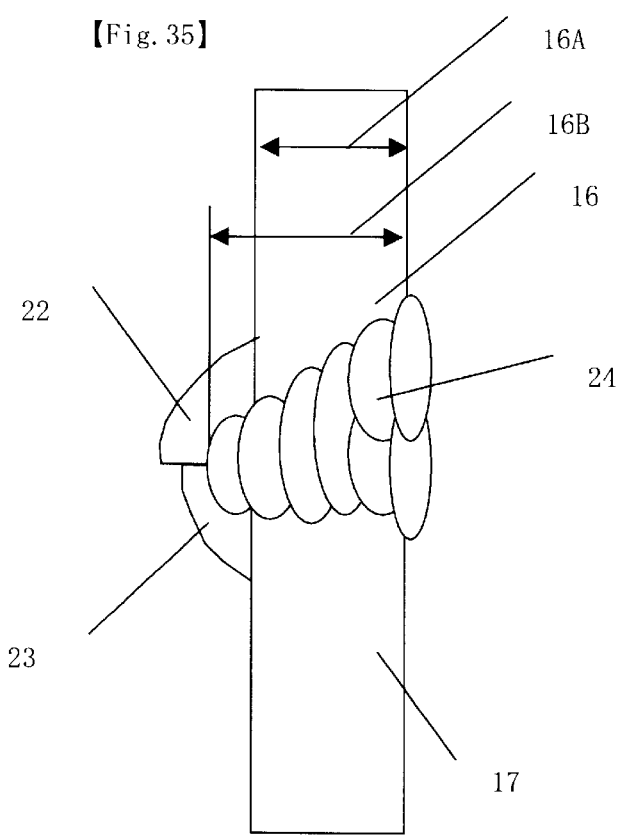

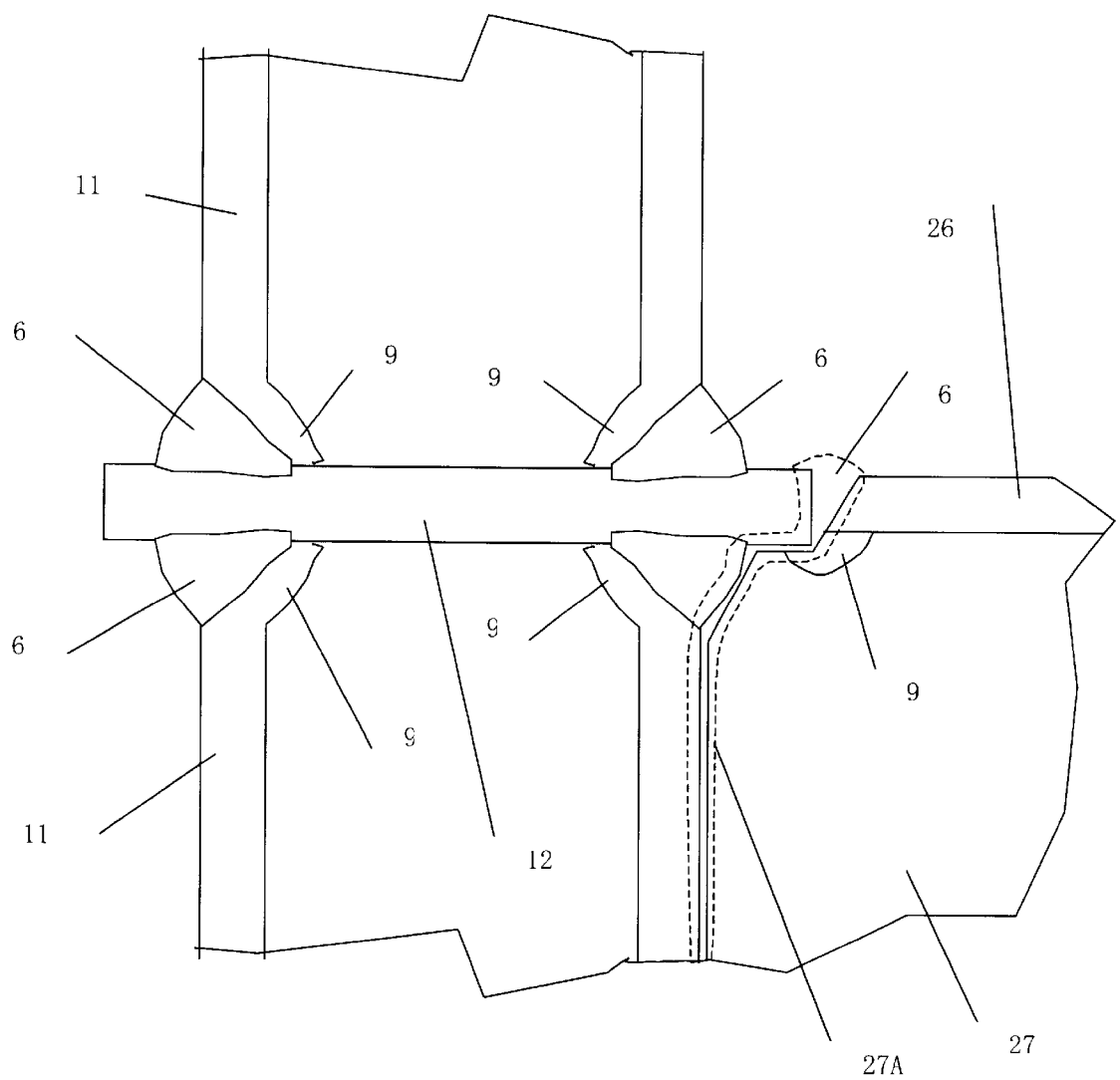
[Fig. 36]

[Fig. 37]
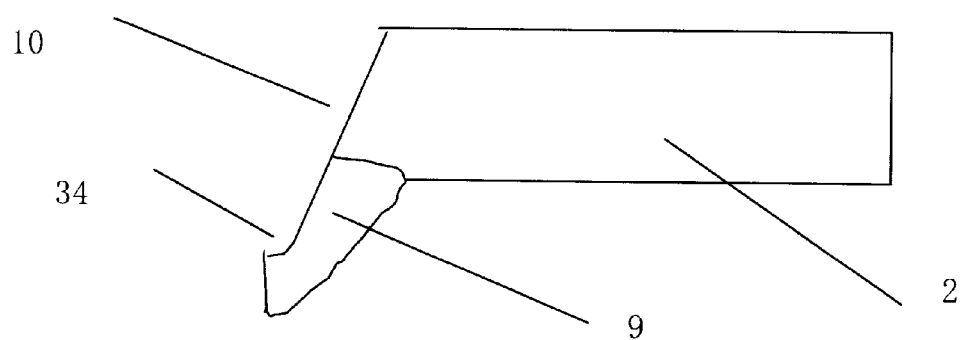

[Fig. 38]
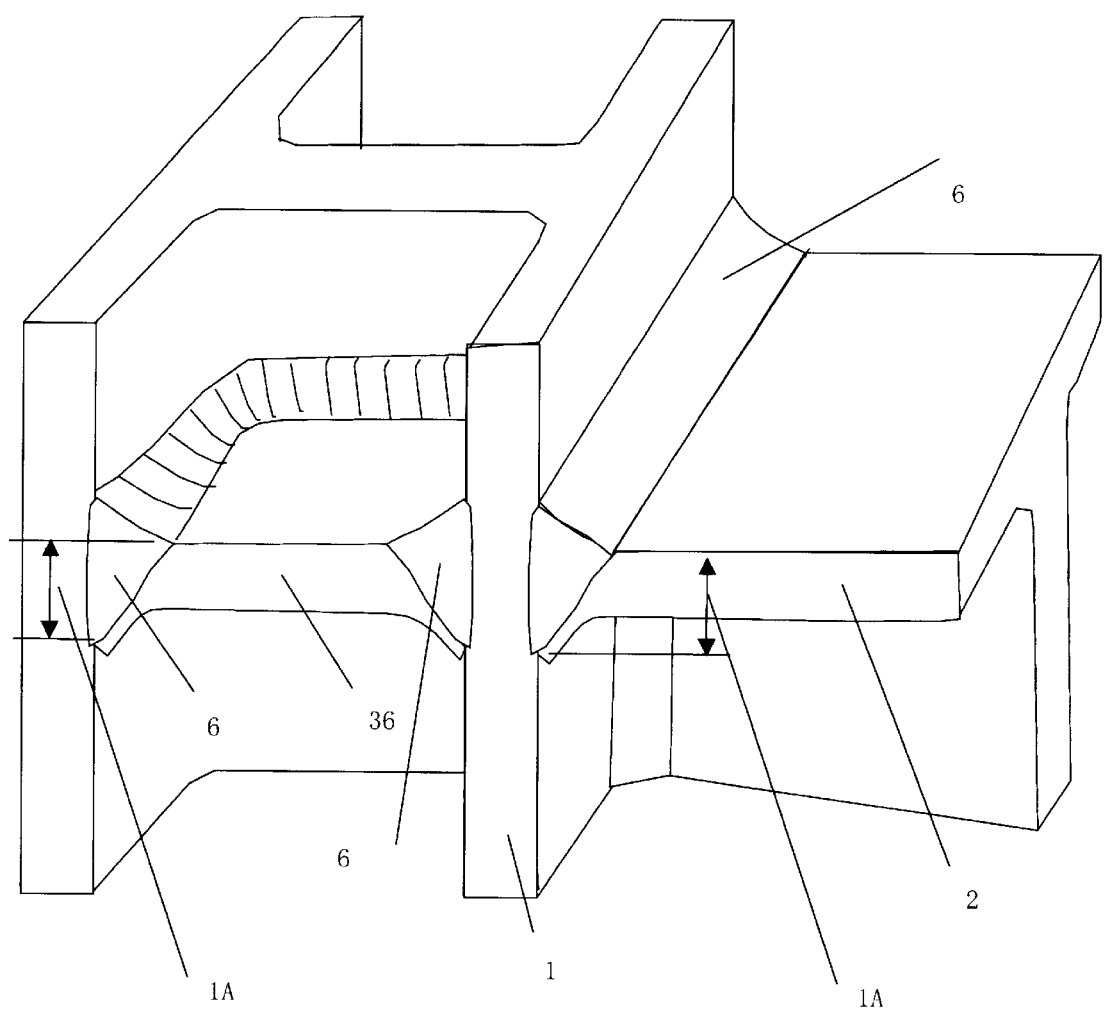

[Fig. 39]
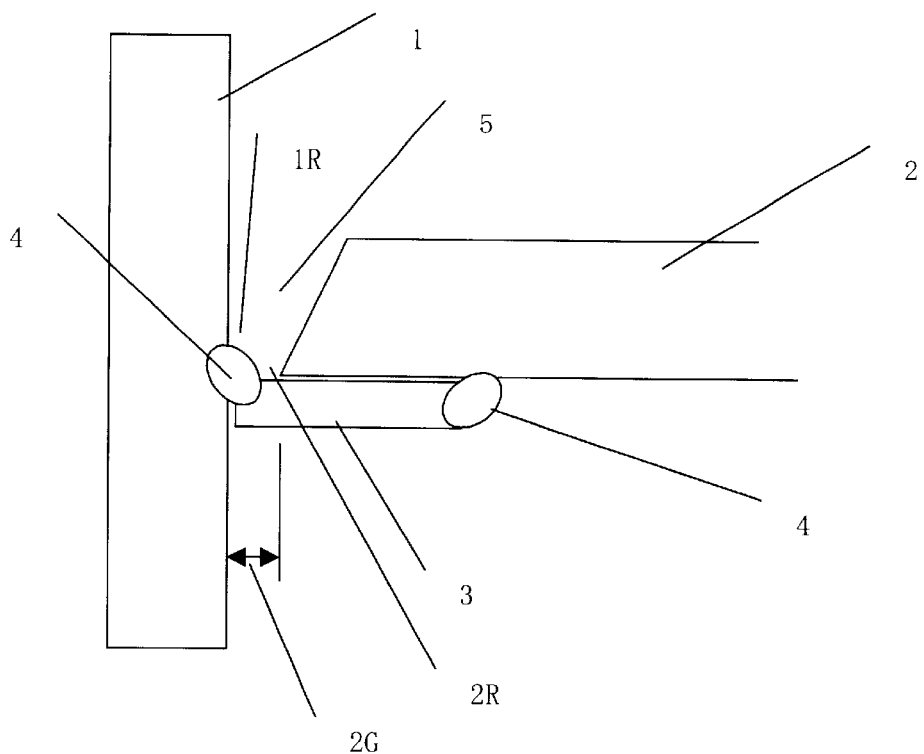
[Fig. 40]
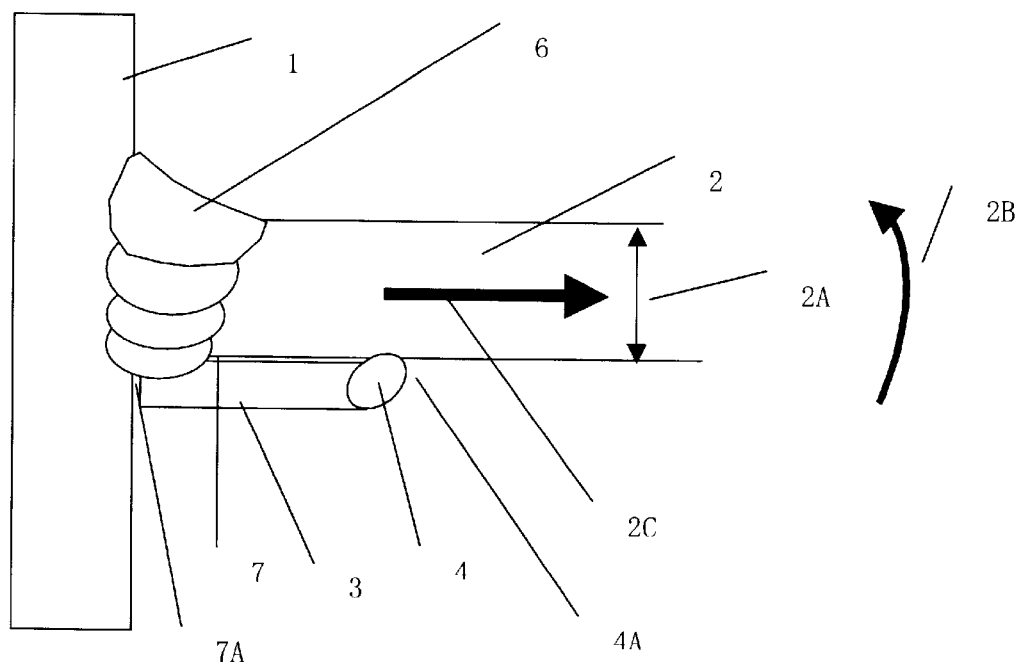

[Fig. 41]
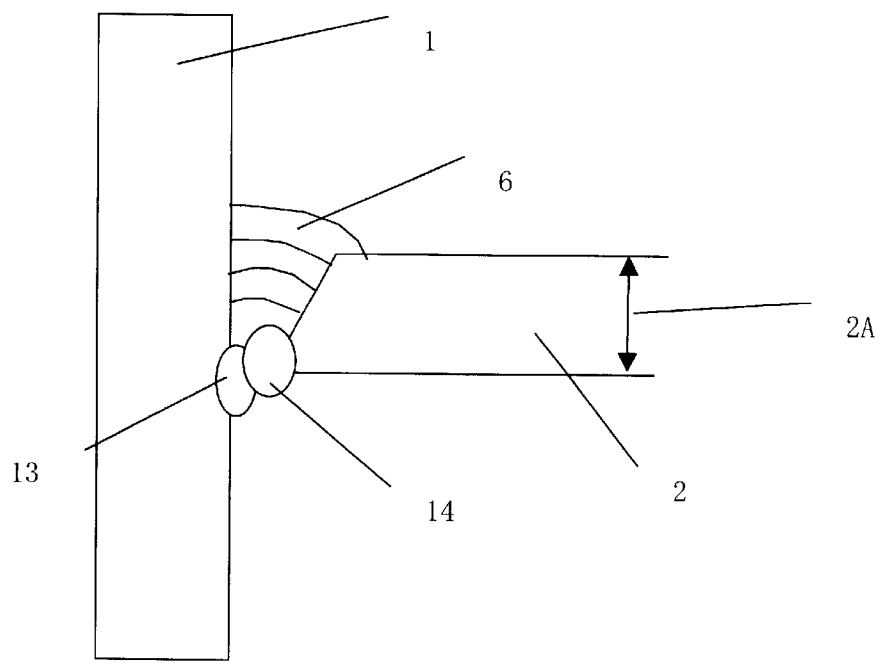
[Fig. 42]
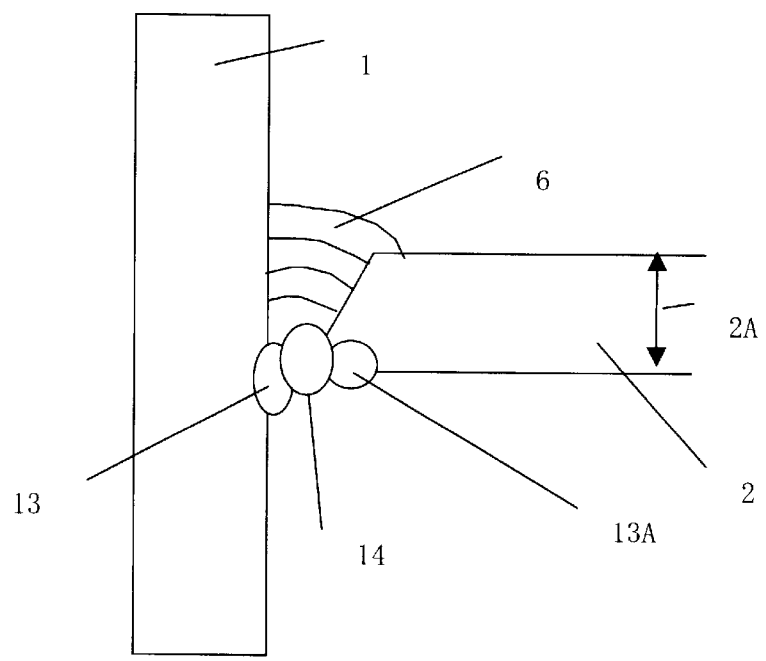

[Fig. 43]
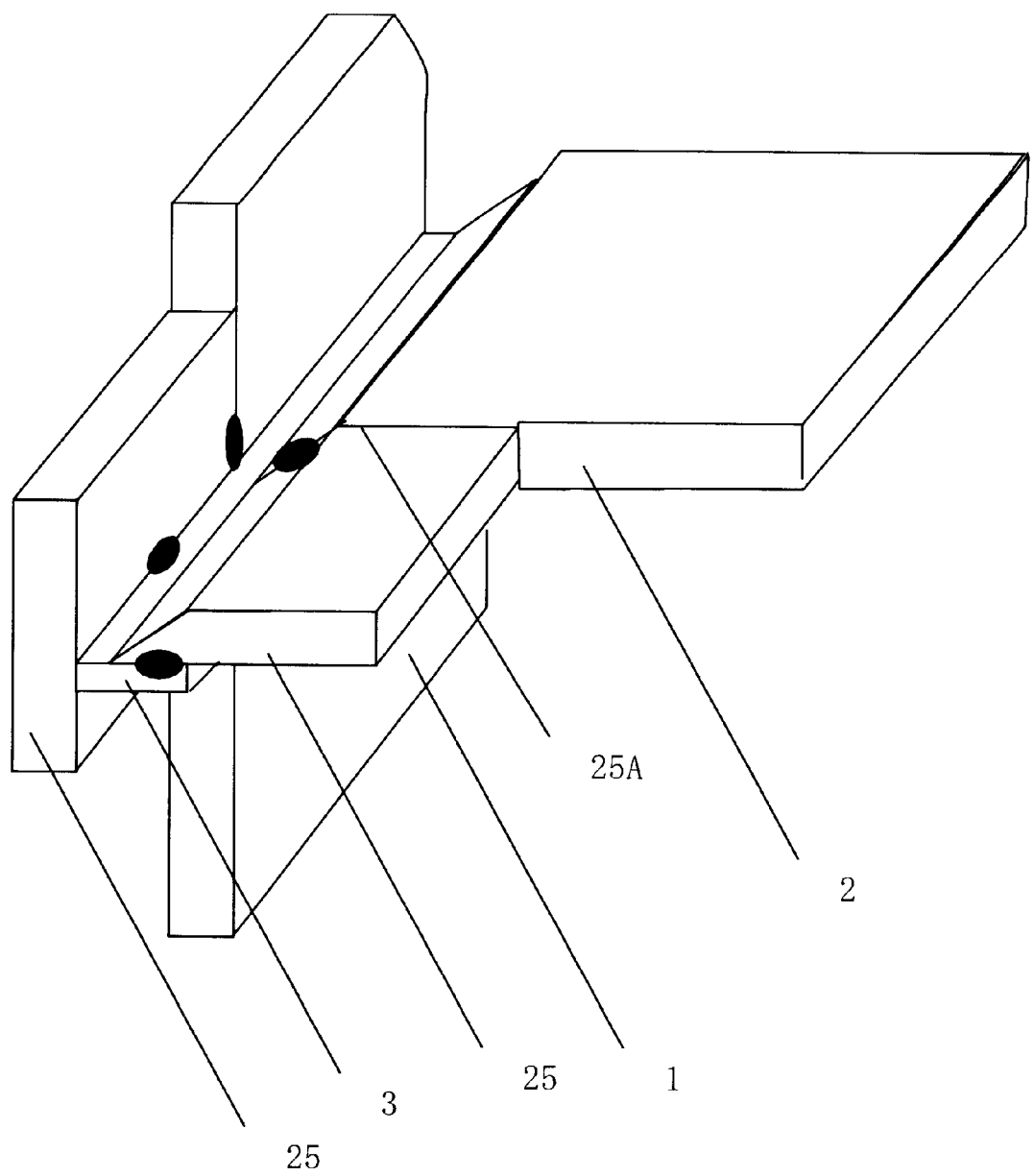

[Fig. 44]
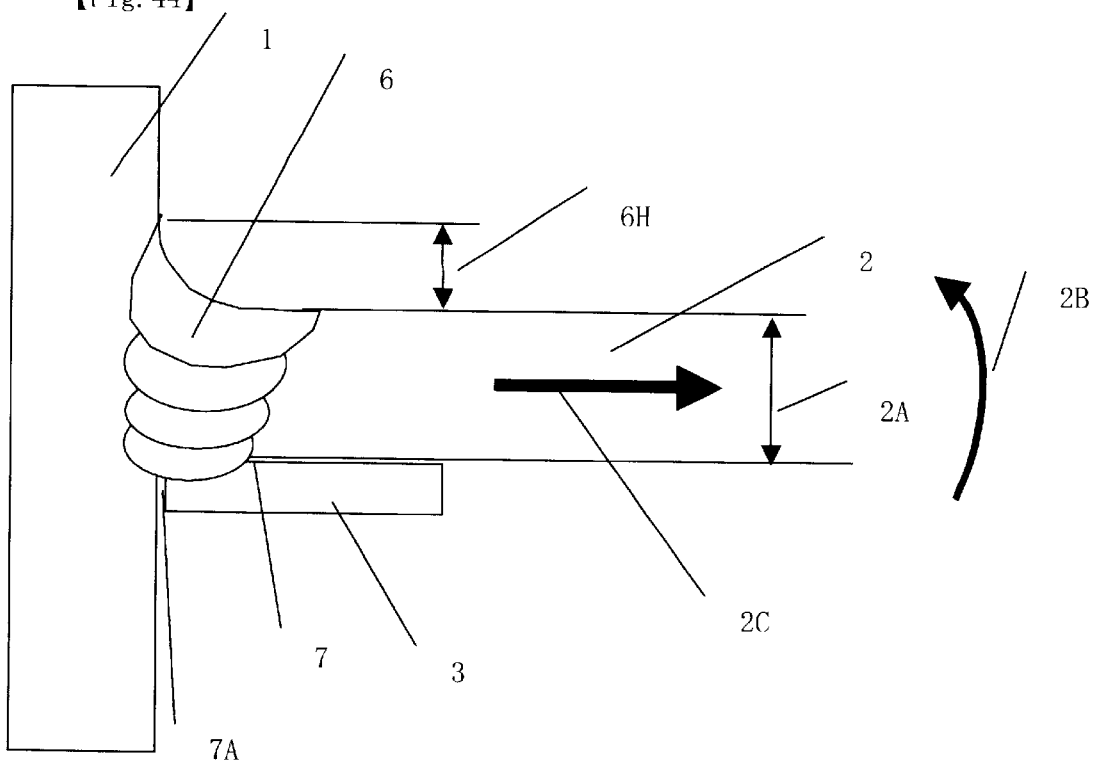
[Fig. 45]
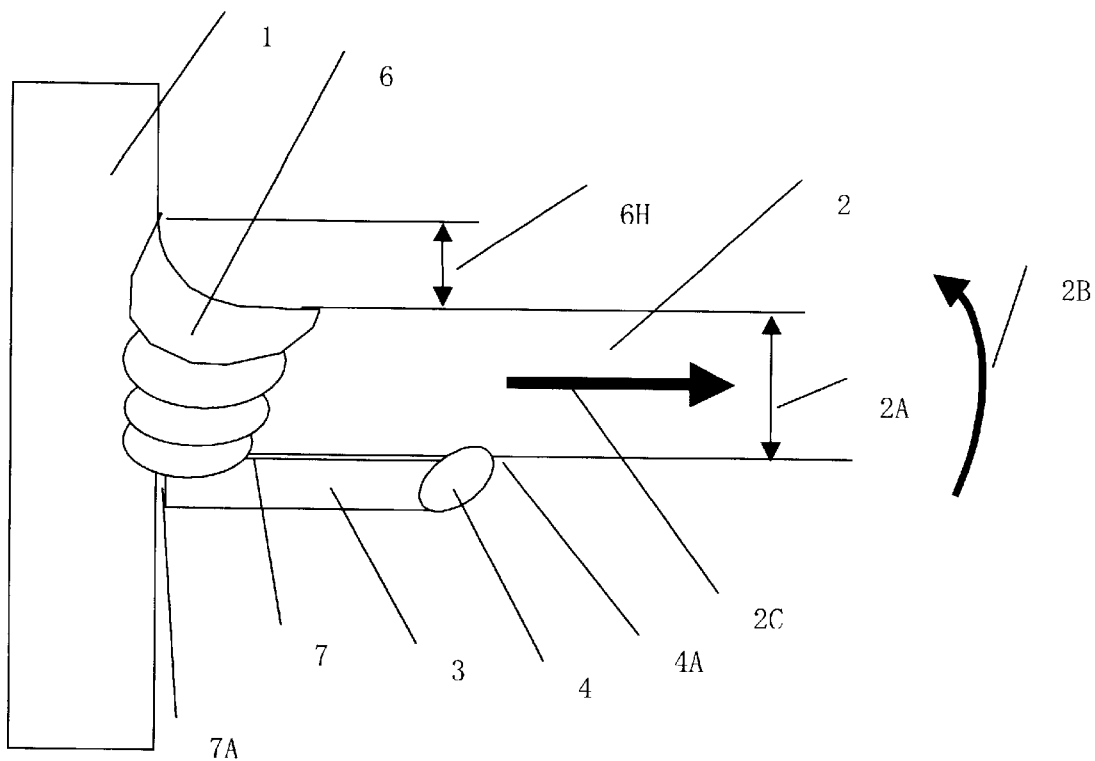

[Fig. 46]
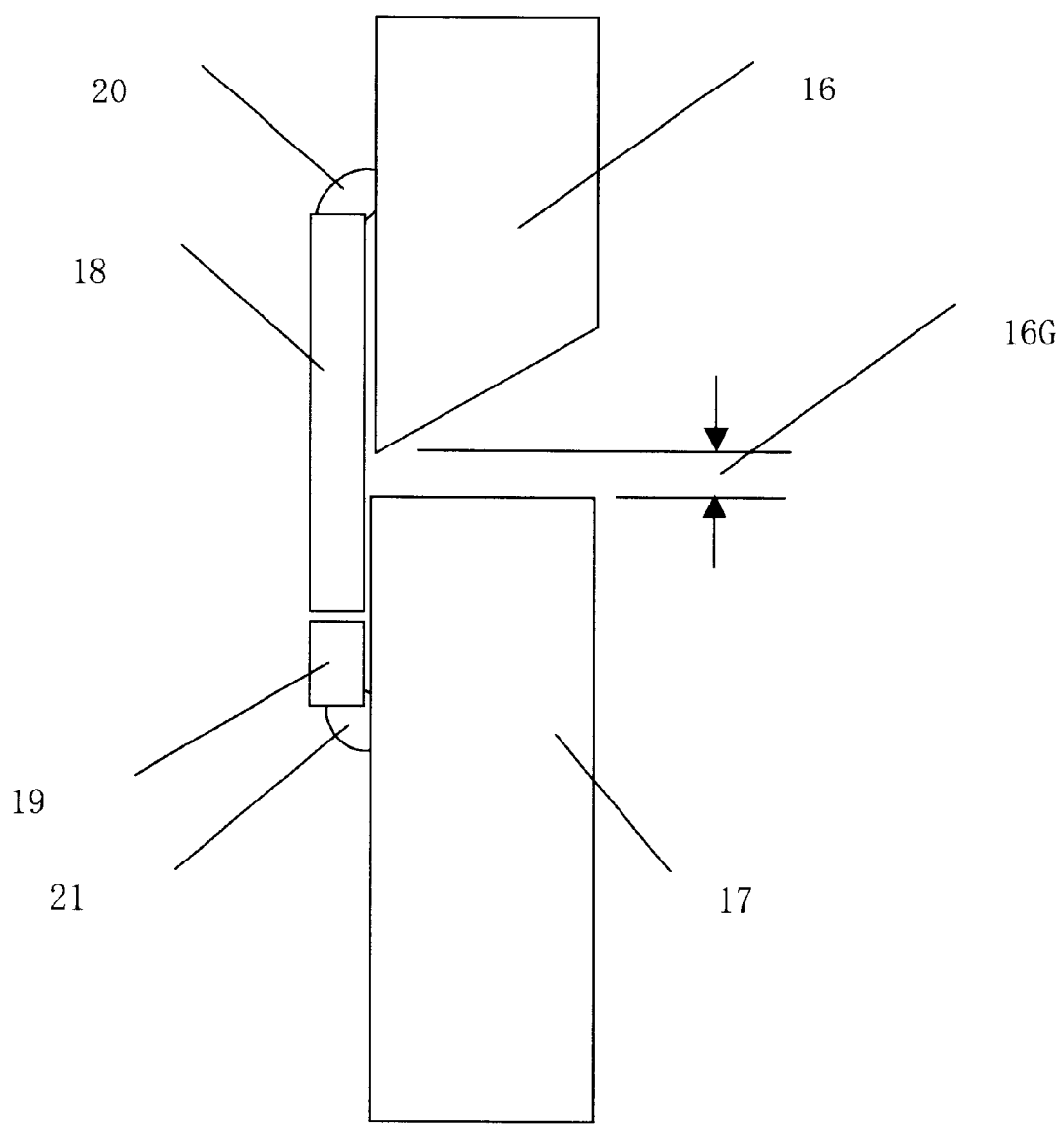

[Fig. 47]
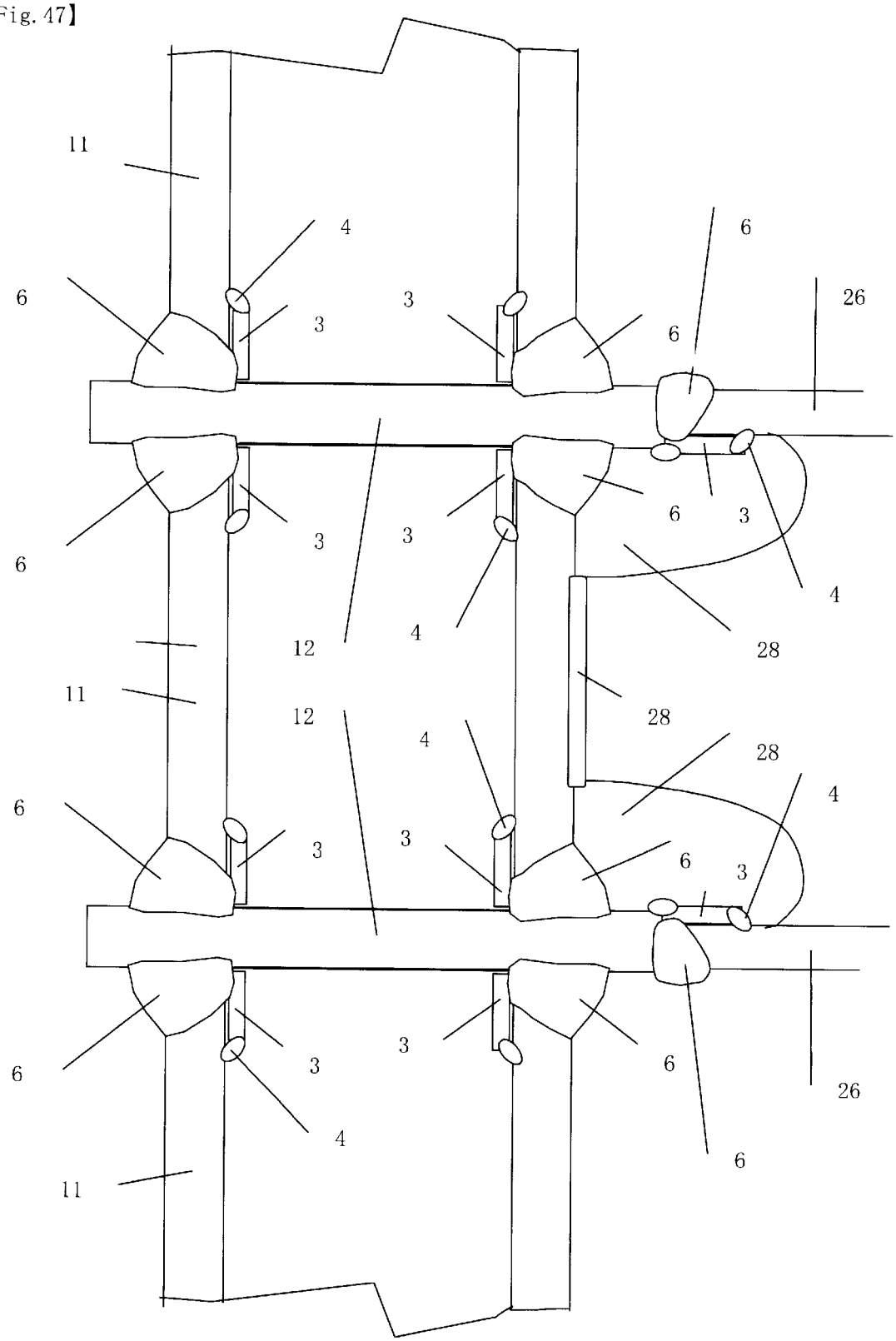

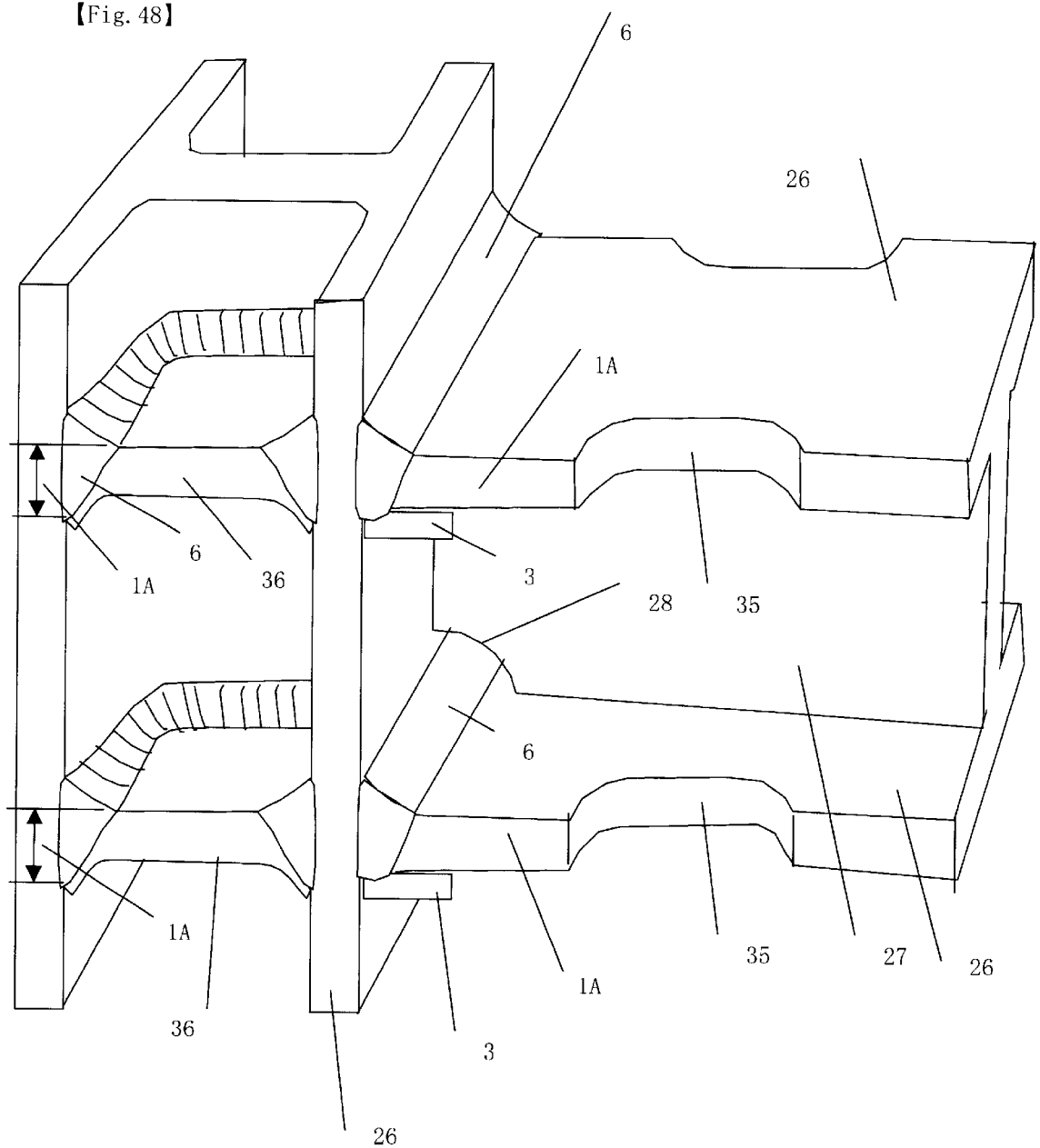
[Fig. 48]

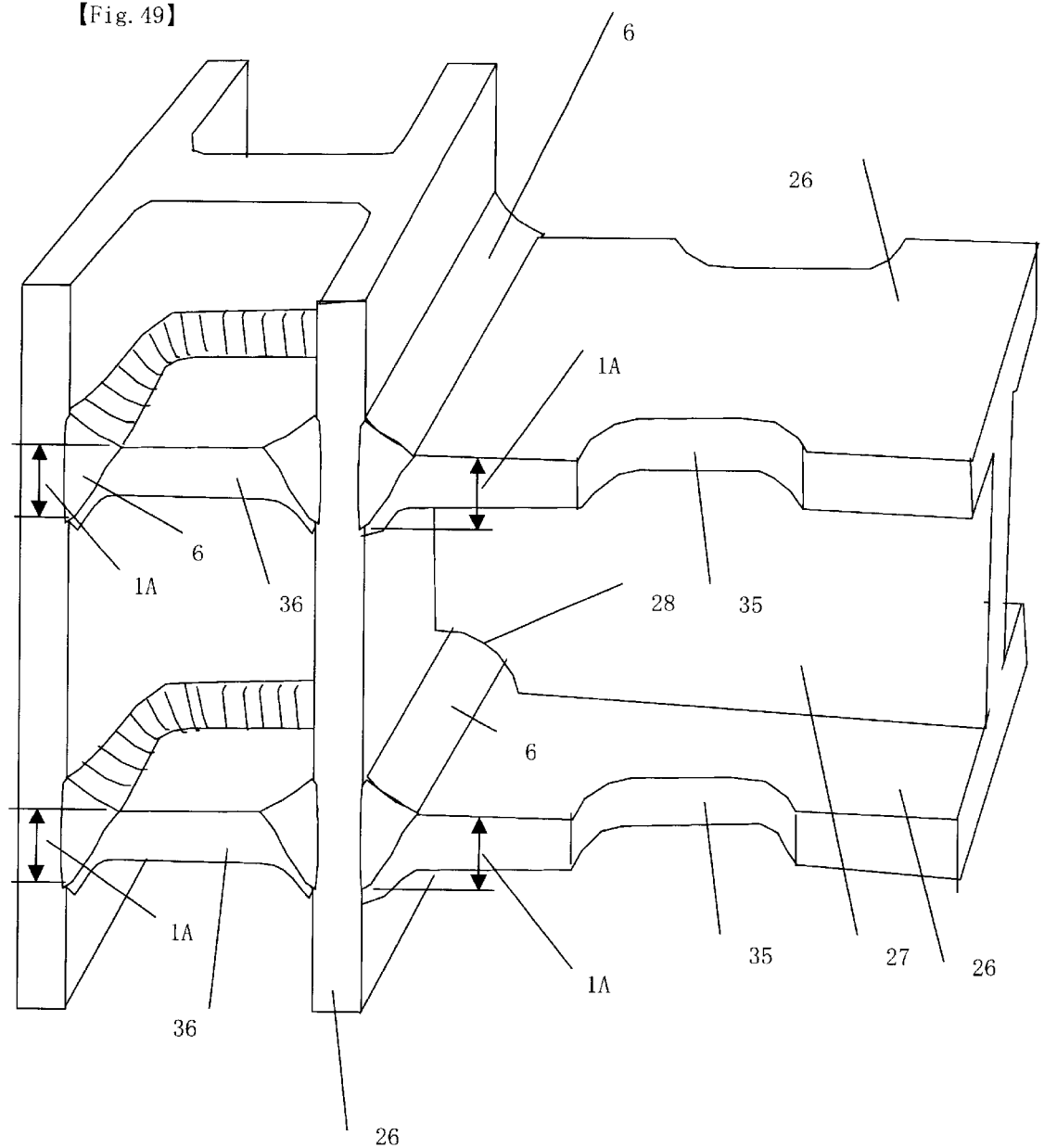
[Fig. 49]

ONE-SIDE WELDING METHOD FOR STEEL STRUCTURE

BACKGROUND OF THE INVENTION

1. Field of the Invention

The present invention belongs to the technical field in which a one-side welding is performed in a building structure, a bridge structure, a general structure, and like.

The present invention relates to a method for obtaining a throat depth exceeding a thickness and a width of an end face of the member for a welding joint. This method can be attained by joint welding using a one-side welding process in which the member is easily welded from the one side without using a consumable backing metal and backing material after performing a welding process for increasing a height and a width of a front bead or a process in which a back face of the end of the member to be welded is subjected to overlay welding and then the groove of the welding member including the overlay weld is made and welded, or a process in which the end of the member is bent to prepare the edge of the member and the prepared edge is subjected to joint welding.

2. Description of the Related Art

FIGS. 39 and 40 illustrate cross-sectional views showing one example of a conventional steel structure welding method. In this example, a member 1 and a member 2 with an edge prepared to have an inclination of about 35° are butted and welded by a T-joint. A backing metal 3 is abutted on a back face so as to perform tack welding 4 such that they are stably welded from one side to be fully penetrated as shown in FIG. 39. After that, joint welding 6 is carried out as shown in FIG. 40. Namely, according to the prior art, the joint with backing metal in which welding is performed from one side is being the standard for the steel structure welding for building as shown in FIGS. 39 and 40.

In the above conventional method, as shown in FIG. 39, two recesses 1R and 2R are formed at a root of a groove 5 where the members 1 and 2 are brought in contact with the backing metal 3, and these portions are not easily to be melted, making it prone to cause incomplete penetration.

Moreover, this requires the production of the backing metal 3 and the tack welding 4 for attaching the backing metal after preparing a groove 5, and this results in an increase in the number of man-hours needed to produce the steel structure in view of efficiency of joint welding.

Additionally, in the following joint welding 6, since the backing metal 3 is left, there remain a harmful notch, which generates stress concentration due to the residual of the tack welding 4, and harmful notches 7 and 7A, which apply stress concentration to the portion among the backing metal 3 and the base metals 1 and 2. This causes the joint properties such as bending ductility, fatigue strength, earthquake resisting strength, etc., to be damaged. In the experiment, when the member 2 received a upward bending load 2B in the joint form shown in FIG. 40, cracks occurred mainly at harmful notches 7 and 7A and the joint was broken.

In the conventional method, the production of the backing metal 3 and the tack welding 4 for attaching the backing metal 3 are needed after performing the edge preparation of the end face to be welded of the member, so that welding 6 of the actual joint cannot be immediately started. This results in a disadvantage in which the number of man-hours needed to produce the steel structure is increased in view of the production processes and steps.

Moreover, in this conventional art, if the backing metal 3 is omitted, there must be carried out uranami welding that forms a good shaped uranami bead with no defect from the front side of the groove to the back face of the first layer. In the steel structure production, however, there are difficulties in maintaining the groove accuracy resulting from the size accuracy of material, ensuring an amount of uranami welding, and using high current from the first layer, and these makes it difficult to implement such good uranami welding.

Though the use of consumable backing material is possible to form an excellent uranami bead, this method causes problems in which the consumable backing material is expensive and much time is required to attach and detach the backing material. In a case in which a space whose interior is closed as in a connection of a building steel structure using square pipes or circular pipes as columns as shown in FIG. 47, there is problem in which the consumable backing material cannot be detached after welding.

There is another method in which an overlay welding bead 13 is preset on the member 1, which is not the end face of T-joint, the member 2 is placed thereto, and welding 14 of the first layer is performed from the front side of the groove, thereafter joint welding 6 is carried out as shown in FIG. 41.

Though this method is a simple and easy way in which the backing metal can be omitted, projections and depressions are generated by the waves of the overlay welding bead and the position of the overlay welding bead 13 is preset, whereby making it difficult to adjust and change the setting position of members each having a different size accuracy. Further, this welding is difficult to be carried out unless the welding position is horizontal welding. The member 1 needs a constant inclination to form the good uranami bead. Some experience is required to perform welding 14 of the first layer from the surface and high current cannot be used. Moreover, the above method does not lead to an increase in a throat depth 2A.

There is another method in which an overlay welding bead 13A is preset on the back face of the member 2 whose end face is subjected to edge preparation in addition to the overlay welding bead 13 preset on the surface of the member 1 of the T-joint, the member 2 is placed thereto, the welding 14 of the first layer is performed from the front side of the groove, thereafter the joint welding 6 is carried out. Though this method is a simple and easy way in which the backing metal can be omitted, the same problem as explained in FIG. 41 exists therein. When the overlay welding bead 13A is placed to the top end of the member 2, welding is not easily carried out. In addition, the overlay welding bead must be present with respect to two portions of both members of the T-joint, resulting in difficulty of welding and an increase in the number of man-hours needed to produce the steel structure.

Unlike the peripheral welding of the square pipe and the circular pipe in which a welding start point and a welding end point are overlapped with other, a width of an H shape steel flange has a finite width in welding the end portion of the flange. In order to obtain satisfactory welding with no defect at a start point of weld bead and an end point of weld bead, steel end tabs are needed as shown in FIG. 43. As a result, much production cost of end tabs and numerous attaching steps are required. The use of ceramics end tab has been recently increased in place of the steel end tab. In this case, high production cost and the attaching work are also required. Moreover, the steel end tab has a notch, which generates stress concentration between the tab and the flange, and the ceramics end tab has a disadvantage in which weld detects are easily generated.

"Japan Architectural Standard Specification JASS6" dated Feb. 20, 1997 and "Recommendation for Quality Criteria and Inspection of Steel Structures" dated Jul. 1, 1998 of The Architectural Institute of Japan define as follows:

The reinforcement height of the member 2 at the surface position of the opponent member 1 must not only satisfy the size ranging from 25% of a plate thickness t to addition of 10 mm to the value of 25% but also be smoothly changed from the base metal surface, in the T-joint with the plate thickness of, for example, 40 mm or less, as shown FIGS. 44 and 45.

The above requirement is useful to relax the stress concentration of a face bead, but the above reinforcement height is allowable even if the height at the center of bead is zero and this requirement does not refer to the effect of the height at the center of bead on the stress concentration at weld toe. Namely, in such a bead, as shown in FIG. 44, stress concentration at the roots 7 and 7A of the joint welding 6 is increased by bending moment 2B and a tensile load 2C, so that cracks are easily generated at the roots 7 and 7A. In a case where the backing metal 3 and the tack weld 4 are placed at the face of the member 2, as shown in FIG. 45 stress concentration works on the root of the tack weld 4 and a tack weld toe 4A in addition to the root 7 of the joint weld 6, and a crack is easily generated particularly from the tack weld toe 4A.

Furthermore, welding with a finite length in a width direction is performed with respect to the longitudinal end of the H shape steel flange. Then, the end tab is often used in order to obtain the structural integrity of the start point of weld bead and the end point thereof, but the use of the tab needs the production cost and the attaching cost. For this reason, an easy and low-cost welding method in which the end tab is omitted has been desired.

SUMMARY OF THE INVENTION

An object of the present invention is to achieve a reduction in the number of man-hours needed to production in view of joint welding efficiency, a reduction in the number of man-hours needed to produce steel structure in view of production processes and steps, improvement of easiness of positional adjustment between joint members to be welded, improvement of weldability, an increase in a throat depth, and elimination of inhibition factors of joint performance resulting from the residue of harmful notches causing stress concentration on a backing metal or between an end tab and a base metal and harmful notches causing stress concentration on a tack welding portion of the backing metal, by forming a groove face larger than a groove face formed by joint members themselves and controlling a joint welding bead shape of a final layer of the front side in one-side welding for steel structure.

The present invention performs the following one-side welding without using the backing metal or consumable backing material, which is left on the joint after welding.

More specifically, as shown in FIG. 1, a metallic or non-metallic backing material 8, which is not melted by a welding heat source such as arc heating etc., is placed to an end face 2T of a T-welding joint member, which is not yet subjected to edge preparation, or one end face of butt welding members where two members are in substantially the same plane or both end faces, overlay welding 9 is performed between a back face of the end face 2T of the member 2 and the backing material 8 to have a predetermined shape so as to increase a plate thickness of the end face of the member 2. After that, as shown in FIG. 2, edge preparation is provided to the end of the member including overlay weld metal such that both members are flush with each other. Thereafter, joint members 1 and 2 are opposed to each other as shown in FIG. 3. Then, as shown in FIG. 4, the welding joint members are welded to each other as melting a groove face 10 consisting of the overlay weld metal and the member of FIG. 3 from a front side of the groove, whereby ensuring a throat depth 1A exceeding a plate thickness 2A of the welding joint end face member 2.

According to the present invention, in the execution of T-joint welding and the butt welding where two members are in substantially the same plane, a foremost end of the end face of the joint member subjected to the edge preparation after the overlay welding is brought in contact with a predetermined position of the opponent's member, and then the foremost end may be directly welded to the opponent's member. As a result, the backing metal 3 of FIG. 40 can be omitted to obtain ease of setting of the member 2, and support to melted weld metal from the back side by the overlay weld 9 can be obtained. This makes it possible to use high current of the first layer. Since the groove is deep and has no backing metal, favorable penetration of member roots 1R and 2R of FIG. 39 can be easily obtained. This makes it possible to reduce a groove gap 2G of FIG. 3 about 50% as compared with the gap of about 7 mm in case of a backing metal used, and to decrease a ross-sectional area of the groove by about 30%. As a result, the amount of weld metal can be decreased and welding time and welding distortion can be reduced. Combination of these effects makes it possible to largely reduce the number of man-hours needed to produce the steel structure in view of the defect prevention in the root of the welding joint, and to improve the reservation of size accuracy of the steel.

According to the present invention, unlike the prior art of FIGS. 41 and 42, welding position for performing stable uranami welding 14 is not limited to horizontal position in view of welding workability. Namely, stable welding can be executed at all positions by the support from the back side of the overlay weld similar to the normal joint welding. At the same time, if the production of backing metal after edge preparation and the off-line work process of attachment are omitted and overlay welding is performed before the edge process, numerous joint welding is continuously performed from the edge preparation. This allows a large reduction in the number of man-hours needed to produce the steel structure in view of the production processes and steps. Moreover, according to the method of the present invention, even if the notch 7 of the conventional method is eliminated but a notch corresponding to notch 7A exists, the throat depth can be increased and such a notch is not regarded as a harmful notch and improvement of joint bending ductility and fatigue strength can be obtained and earthquake strength can be easily ensured. According to the experiment, in the case of 10% or more increase in the throat depth, joint bending ductility was improved about twice and fatigue strength was improved about ten times.

In the method according to the above invention, in place of using the backing material, which is not melted by the welding heat source such as arc heat, overlay weld 9 with a predetermined shape is provided to the back face at the designed edge preparation location to be served as an end of the joint member 2 as shown in FIGS. 5 and 6. Thereafter, the member 2 at the designed edge preparation location and the overlay weld metal 9 are cut at the same angle as that of the face of the member as shown in FIG. 2. After cutting, a predetermined edge preparation is performed, so that a joint end face, which is not yet joint-welded, can be obtained. Thereafter, the joint end face members are opposed to each other as shown in FIG. 3, and they are welded to each other as melting the groove face 10 of the overlay weld metal and the members from the front side of the groove, so that one-side welding is performed to ensure the throat depth 1A exceeding the plate thickness of 2A of the welding joint end face member as shown in FIG. 4.

According to the present invention, the groove shape, which is not yet welded, and the joint shape after the welding can be obtained similar to the method according to the above invention. This makes it possible to obtain easiness of welding workability, which is the same as that of the method according to the above invention, and reduction in the number of man-hours needed to produce the steel structure and reservation of good welding property.

Also, when welding is performed to the H-shape steel flange in which a welding start point and a welding end point are not overlapped with other unlike in the peripheral welding of the square pipe and the circular pipe, the steel plate flange becomes a finite width. Then, when the conventional welding with the attachment of the backing metal or the method of each invention as mentioned above is applied, the end tab 5 and ceramics end tab for the end tab 5 as shown in FIG. 5 are needed to obtain satisfactory welding with no defect at a start point and an end point of the weld. The present invention provides means for eliminating the above need.

In other words, the present invention is the one-side welding method as described below.

More specifically, there is a case in which overlay welding is performed between the back face of the steel member with a finite width and the backing material by the method of the above invention or a case in which overlay welding is provided to the back face of the designed edge preparation location serving as an end of the steel member with a finite width. In either case, overlay welding is performed to the member including the steel plate side face 2S as shown FIGS. 7 to 12. After that, edge preparation is provided to the member 2 including the overlay weld metal 9 of the back face and side face of the steel plate as shown in FIGS. 13 and 14 so as to form the groove face 10, which is larger than the groove face formed by the members themselves. Thereafter, the joint members are opposed to each other as shown in FIG. 3, they are welded to each other as melting the groove face 10 including the overlay weld metal, whereby ensuring the throat depth 1A in the direction of the plate thickness exceeding the plate thickness of 2A of the member as shown in FIG. 4, or a throat depth 2Q in the direction of the plate width exceeding a plate width 2P of FIG. 13, or a throat depth in the directions of plate thickness and the plate width exceeding both plate thickness and plate width.

According to the present invention, as compared with the conventional joint of backing system, after the joint welding, there is no stress concentration caused by harmful notches as shown in 7 of FIG. 40 or 25A of FIG. 43, the plate thickness and plate width at the cross-section of joint can be increased, the tensile strength in plane of the joint can be increased, and bending strength, bending ductility, and fatigue strength in the direction of the plate thickness of the joint and that of the plate width can be increased. Also, it is possible to omit the steel end tab shown in FIG. 43 and ceramics end tab for the steel end tab. In addition, there is a case in which welding defect easily occurs in the ceramics end tab. The execution method of the present invention is effective in these cases.

Also, there is a case in which a larger overlay weld must be formed to obtain a predetermined leg length at the side of the non-consumable backing material, since wettability between the non-consumable backing material and the overlay weld metal is low in performing the overlay welding according to the method of each invention. The present invention relates to a method for forming overlay welding bead, which improves wettability between the non-consumable backing material and the overlay weld metal and which forms smooth bead shapes between both weld toes of the overlay weld in the above case.

Namely, the present invention is the method, which is used when overlay welding according to the method of each invention is performed. More specifically, a thin steel plate 29 of the same material as the overlay welding material or the welding joint member is attached to the overlay welding side of non-consumable backing material in advance as shown in FIG. 15. Then, overlay welding 9 is provided to the back face of the member 2 or the side face including the back face between the non-consumable backing material 8 and the member 2 as shown in FIG. 16. The thin steel plate 29 has an effect that draws the melted metal to the side of the thin steel plate, that is, to the direction of the non-consumable material by surface tension when being melted partially at the overlay welding. This is effective in obtaining the smooth overlay welding bead shape 9 from the non-consumable backing material 8 to the member 2. By this smooth overlay welding bead shape 9, the maximum overlay weld leg length with a minimum amount of overlay weld can be obtained at the side of the non-consumable backing material. Thus, the thin steel plate is useful to form the shape of the overlay metal smoothly when being melted. The thickness of the thin steel plate was less than 3 mm appropriately in consideration of penetration at the welding, cost efficiency, and edge preparation of post-process. If the overlay weld thus obtained is subjected to edge preparation together with the member 2 at the position indicated by 30 of FIG. 16A, a groove, which is larger than the plate thickness of the member 2, can be obtained as shown in FIG. 16B. If the member 2 subjected to edge preparation as shown in FIG. 16B is brought in contact with the plane of the opponent's material 1 and is subjected to joint welding 6 as shown in FIG. 19, the throat depth, which is larger than the plate thickness of the material 2 or the plate width thereof, can be obtained.

Moreover, the above invention cannot be executed when edge preparation is performed before the overlay welding for the reason of production process such processing on commission. For this reason, the present invention provides a method in which overlay welding is provided to the member subjected to the edge preparation previously using the non-consumable backing material so as to increase the groove area formed by the member.

Namely, according to the present invention, in the steel structure, the backing material 8, which is not melted by a welding heat source such as arc heating etc., is placed to an end face of a T-welding joint member, which is subjected to edge preparation 32 in advance as shown in FIG. 17, or one end face or both end faces of butt welding members, and thereafter, overlay welding 9 is performed between a back face of the end of the member or the back face including the side face of the end of the member and the backing material 8 as shown in FIG. 17. After that, a part 33 of the backing material contacting surface of the overlay weld metal 9 is used as an extension of a joint groove 32 of the main member. Thereafter, the joint members are opposed to each other as shown in FIG. 3, they are welded to each other as melting the groove face including the overlay weld metal, whereby ensuring the throat depth in the direction of the plate thickness exceeding the plate thickness of the member as shown in FIG. 4, or the throat depth in the direction of the plate width exceeding the plate width, or the throat depth in the directions of plate thickness and the plate width exceeding both plate depth and plate width.

According to the present invention, there are disadvantages in that the part 33 of the backing material contacting surface of the overlay weld metal 9 easily deviates from the joint groove 32 of the main member and the continuous execution from the edge preparation to the joint welding can not be carried out. However, this invention is effective as an alternative to the above-mentioned invention in the joint welding of the end face subjected to the edge preparation. The reason why a partially vertical face 31 of the non-consumable backing material in FIG. 17 is formed is that the overlay weld metal is put in contact with a vertical groove face of the single bevel groove of the opponent's member to position the member 2 in right and left axial directions as shown in FIG. 3. This invention is made by the same process as the aforementioned invention, and has numerous advantages, which compensate for the disadvantages of the conventional method. Unlike the method in which the overlay welding 13 is provided to only the diaphragm member 1 of FIG. 41 without using the backing material and the method in which the overlay welding 13 and 13A is provided to both members 1 and 2 of FIG. 42 without using the backing material, the present invention is the method that can solve the problems of the prior art as in FIGS. 41 and 42 and achieve the part of the effects of the aforementioned invention. Furthermore, combination of this invention and the invention shown in FIGS. 15 and 16 is effective in obtaining the smooth overlay shape.

According to the present invention, one-side welding is performed by the following method when the present invention is applied to the square steel pipe with a small diameter.

More specifically, in order to eliminate the corners of the roots 1R and 2R of FIG. 39 to largely reduce stress concentration at the roots, the backing material 8 such as copper, which is not melted by the welding heat source, is placed to the back face of the end of the member as shown in FIG. 18. Then, the overlay welding 9 is performed between the back face of the joint member 2 and the backing material 8 and edge preparation is performed to the end of the member including the overlay weld metal as shown in FIG. 2. Thereafter, the joint members are opposed to each other as shown in FIG. 3, and they are welded to each other as melting the groove of the overlay weld metal from the front side of the groove as shown in FIG. 4, whereby ensuring the throat depth in the direction of the plate thickness exceeding the plate thickness of the member.

According to the present invention, one-side welding is performed by the following method when the present invention is applied to the case the one-side butt welding in which two members such as square steel pipes with a small diameter welded to each other are in substantially the same plane.

More specifically, the backing material 8 such as copper, which is not melted by the welding heat source, is placed to the back face of one end or both ends of the butt welding members as shown in FIG. 18. Then, the overlay welding 9 is performed between the back face of the end face 2T of the joint member and the backing material. After that, edge preparation is performed to the end of the member including the overlay weld metal as shown in FIG. 2. Thereafter, the joint members are opposed to each other as shown in FIG. 3, and they are welded to each other as melting the groove of the overlay weld metal from the front side of the groove as shown in FIG. 4, whereby ensuring the throat depth in the direction of the plate thickness exceeding the plate thickness of the member. In this way, since the groove for overlay is opened to the outside at the end face of the square steel pipe with a small diameter, overlay welding can be easily carried out even at the end face of the square steel pipe with a small diameter.

According to the present invention, there is a case in which T butt joint welding or butt welding where two members are in substantially the same plane is performed, for example, with the backing material such as copper, which is not melted by the arc heat, placed to the back of the end of, e.g., H-shape steel flange in the longitudinal direction, and then overlay welding is performed. In this case, the backing material 8 such as copper, which is not melted by the arc heat, is placed thereto to enclose the end of the flange as shown in FIG. 19A. Then, overlay welding is provided to the member including the side surface of the flange and edge preparation is performed to the member 2 including the overlay weld as shown in FIG. 13 so as to obtain the groove depth, which is larger than the plate thickness of the member 2, and the groove length, which is larger than the plate width. Thereafter, joint welding is carried out, so that the joint weld can ensure the throat depth in the direction of the plate thickness exceeding the plate thickness of the flange or the throat depth in the direction of the plate width exceeding the plate width. Therefore, in this case, the welding joint can obtain bending deformation ability, joint tensile strength, and fatigue strength, which are larger than the conventional welding joint of FIG. 40.

In the steel structure, butt welding with backing metal is normally performed in the T butt welding for attaching stiffener inserted into the H-shape steel flanges, but stress concentration is indeed generated by attachment of the backing metal. In order to relax this stress concentration, according to the present invention, bending process is performed at the end of, such as the stiffener of the T-welding joint member and the outer face of the end of the bend-processed portion is used as a groove face. Or, the end face of the bend-processed portion is subjected to a mechanical or thermal cutting process to produce the groove face. Thereafter, the joint members are opposed to each other, and they are welded to each other from the front side of the groove, whereby ensuring the throat depth in the direction of the plate thickness exceeding the plate thickness of the member to which the end face is welded.

More specifically, one-side welding is performed by the method as follows.

That is, as shown in FIG. 20, the end of the member 2 such as stiffener is bent by a press. Then, when an upper angle portion 2K of the end face of the member 2 is lower than a bottom position 2U of the member 2 by more than about 5 mm, preferably more than 8 mm and less than 12 mm, the outer face of the end face of the bend-processed portion is directly used as a groove face 2F, and the joint members 1 and 2 are opposed to each other as shown in FIG. 21, and joint welding 6 is provided these members from the front side of the groove as shown in FIG. 22, whereby ensuring the throat depth 1A in the direction of the plate thickness exceeding the plate thickness t of the member 2. This makes it possible to omit the backing metal that generates stress concentration and reduces joint strength.

As shown in FIG. 23, the end face of the member 2 such as stiffener is bent by a press. Then, when the upper angle portion 2K of the end face of the member 2 is higher than the bottom position 2U of the member 2 and a lower angle portion 2L of the end face is lower than the bottom position 2U of the member 2 by more than about 5 mm, preferably more than 8 mm and less than 12 mm, the end face of the member 2 is subjected to edge reparation at a process position 2E of FIG. 24 to have a shape with a groove face 2F as shown in FIG. 25. Then, the joint members 1 and 2 are opposed to each other as shown in FIG. 21, and they are welded to each other from the front side of the groove as shown in FIG. 22, whereby ensuring the throat depth 1A in the direction of the plate thickness exceeding the plate thickness t of the member 2 to which the end face is welded.

Also, even in the butt welding where the members are in the same plane, one side or both side bending process of FIG. 20 or FIG. 23 is provided to the end face of at least one of the butt joint welding members. Then, the outer face of the end face of the bend-processed portion is used as a groove face in the same steps as the above stiffener. Or, the end of the bend-processed portion is subjected to a mechanical or thermal cutting process. The end of the member 2 is subjected to edge reparation at the process position 2E of FIG. 24 to produce the groove face 2F as shown in FIG. 25. Thereafter, the joint members are opposed to each other as shown in FIG. 21, and they are welded to each other from the front side of the groove in the way as shown in FIG. 26 when the plate thickness of these members are the same as each other or in the way as shown in FIG. 27 when the plate thickness of these members are different from each other. As a result, the throat depth 1A in the direction of the plate thickness exceeding the plate thickness t of at least thinner member 2 can be ensured. This eliminates the generation of stress concentration due to the notch as in the butt welding joint with a backing metal. This also improves bending ductility of the joint, tensile strength, and fatigue strength.

According to the present invention, when one-side welding is performed in the butt welding joint where T-shape members are substantially right angles to each other, the following welding is performed in order to strengthen the joint of the conventional method as shown in FIG. 40 and to render the harmful notches 7 and 7A of the back face harmless.

More specifically, as shown in FIG. 28, at the side of the member 2 to which the end face is welded, welding is performed such that a position 6T of a welding bead weld toe of the front side is placed to be separated from a position 7 of the welding root of the back face by more than 80% of the plate thickness t of the member of 2A, preferably, to be separated from the plate thickness t of the member of 2A by 1.5 t, that is, $6B \geq 0.8$ t, preferably, $t \leq 6B \leq 1.5$ t in FIG. 28. Moreover, welding is performed such that reinforcement height of the front bead of the final layer in the entire area of the welding bead width of at least back face and reinforcement height 6H of the front bead of the final layer at the welding root of the back face are ensured by at least more than 10% of the plate thickness t, preferably more than 15% to less than 25%. Furthermore, welding is performed such that reinforcement height of the final layer of the joint weld 6 is smoothly changed from the base metal surface of the joint member 1 to the member 2.

By such welding, in the T-joint of FIG. 28, thickness 2H of the notch portion of the back face is increased, stress concentration at the notch portion is reduced, so that the T-joint is reinforced to improve strength against tensile load 2C of the member 2 and bending moment 2B. In this case, the reason why the welding range is set to preferably less than 1.5 times of the base metal is to prevent welding distortion and welding cost from being increased.

According to the method of the present invention, when tack welding of the backing metal exists as shown in FIG. 29, the following welding is performed.

More specifically, welding is performed such that a distance between the weld toe 4A, which is a stress concentration portion of the backing metal, and the position 6T of the welding bead weld toe of the front side becomes more than 80% of the plate thickness t of the member of 2A, preferably, they are positioned to be separated from the plate thickness t of the member of 2A by 1.5 t, that is, $6B \geq 0.8$ t, preferably, $t \leq 6B \leq 1.5$ t in FIG. 29. Moreover, welding is performed such that reinforcement height of the front bead of the final layer in the entire area of the welding bead width of at least back face and reinforcement height 6H of the front bead at the welding root of the back face are ensured by at least more than 10% of the plate thickness t, preferably more than 15% to less than 25%. Then, welding is performed such that reinforcement height of the final layer of the joint weld 6 is smoothly changed from the base metal surface of the joint welding member 1 to the member 2.

According to the method of the present invention, when one-side welding is performed in the butt joint where two members to be welded to each other are in the same plane, the following welding is performed.

More specifically, as shown in FIG. 30, at the connection using the square steel pipe as a column and at least the thinner member (flange 2) of two members, that is, flange 2 and diaphragm 12, welding is performed such that the position 6T of the weld bead toe of the front side is separated from the position of the welding bead root 7 of the back face or the weld toe where the tack welding is provided to the backing metal 3 by more than 80% of the plate thickness, preferably, the position 6T is separated therefrom by more than the plate thickness t of the member 2A, that is, $6B \geq 0.8$ t, preferably, $t \leq 6B \leq 1.5$ t in FIG. 30. Moreover, welding is performed such that reinforcement height of the front bead in the area of the welding bead width of at least back face is ensured by at least more than 10% of the plate thickness t, preferably more than 15% to less than 25%. Then, welding is performed such that reinforcement height is smoothly changed from the base metal surface.

BRIEF DESCRIPTION OF THE DRAWINGS

These objects and other objects and advantages of the present invention will become more apparent upon reading of the following detailed description and the accompanying drawings in which:

FIG. 1 is a cross-sectional view illustrating one example in which a water-cooled or non-water-cooled copper is placed at an end of a member and overlay welding is performed;

FIG. 2 is a cross-sectional view showing a state in which overlay welding is performed to the end of the member and both the end portion and an overlay weld are subjected to edge preparation wherein a member 2 is shown in a state that the FIG. 1 is illustrated upside down;

FIG. 3 is a cross-sectional view showing a state in which the end of the member is subjected to overlay welding and edge preparation and the resultant is placed to an opponent member;

FIG. 4 is a cross-sectional view showing a state in which the end of the member is subjected to overlay welding and edge preparation, the resultant is placed to an opponent member and welded;

FIG. 5 is a cross-sectional view showing a state in which one pass overlay welding is performed with respect to an end face to be welded and both the end face and the overlay weld are cut;

FIG. 6 is a cross-sectional view showing a state in which one pass overlay welding is performed with respect to an end face to be welded and both the end face and the overlay weld are subjected to edge preparation;

FIG. 7 is a shop drawing showing a state in which overlay welding is performed among a back face of an end of a steel member with a finite width to be welded and its side face, and a non-consumable backing metal;

FIG. 8 is a shop drawing showing a state in which overlay welding is performed among a back face of an end of a steel member with a finite width to be welded and its side face, and two non-consumable backing metals 8;

FIG. 9 is an outline view showing a state after overlay welding is performed among a back face of an end of a steel member with a finite width to be welded and its side face, and a non-consumable backing metal;

FIG. 10 is an outline view showing a state after overlay welding is performed among a back face of an end of an H shape steel member with a finite width to be welded and its side face, and a non-consumable backing metal;

FIG. 11 is a view showing a state of overlay welding to a steel member with a finite width to be welded;

FIG. 12 a view showing a state of overlay welding to a steel member with a finite width to be welded using a non-consumable backing material;

FIG. 13 is an outline view an outline view showing a state that edge preparation is carried out after overlay welding is performed among a back face of an end of a steel member with a finite width to be welded and its side face, and a non-consumable backing metal;

FIG. 14 is an outline view showing a state that edge preparation is carried out after overlay welding is performed among a back face of an end of an H shape steel member with a finite width to be welded and its side face, and a non-consumable backing metal;

FIG. 15 is a view showing a state that a thin steel plate is placed to an overlay weld side of the non-consumable backing material and is set with the member 2;

FIG. 16 is a view showing a state that a thin steel plate is placed to an overlay weld side of the non-consumable backing material and is overlay welded with the member 2;

FIG. 16A is a cross-sectional view showing a working position for forming a groove including an overlay weld wherein a thin steel plate is placed to an overlay weld side of the non-consumable backing material and is overlay welded with the member 2 and then the non-consumable backing material is removed;

FIG. 16B is a cross-sectional view showing that a thin steel plate is placed to an overlay weld side of the non-consumable backing material and is overlay welded with the member 2 and the non-consumable backing material is removed, and the resultant including the overlay weld is subjected to edge preparation;

FIG. 17 is a cross-sectional view showing that the non-consumable backing material is placed to an end face of a joint member subjected to edge preparation and is overlay welded;

FIG. 18 is a cross-sectional view showing the non-consumable backing material such as copper is placed to the back side of the end of the member to be welded, and the back side of the end is overlay welded by a T welding joint;

FIG. 19 is a cross-sectional view showing that a thin steel plate is placed to an overlay weld side of the non-consumable backing material and is overlay welded with the member 2 and the non-consumable backing material is removed and the resultant including the overlay weld is subjected to edge preparation and joint welding;

FIG. 19A is an outline view showing that backing material such as copper, which is not melted by arc heat, is placed to the back side of an H shape steel flange in its longitudinal direction to enclose the end of the flange;

FIG. 20 is a cross-sectional view showing a member such as a stiffener with an end, which is largely bent by a press, and so on;

FIG. 21 is a cross-sectional view showing a state that a member such as a stiffener with an end, which is bent a little by a press, etc., and which is subjected to edge preparation, is set between H shape steel flanges;

FIG. 22 is a cross-sectional view showing a state that a member such as a stiffener with an end, which is bent a little by a press, etc., and which is subjected to edge preparation, is welded between H shape steel flanges;

FIG. 23 is a cross-sectional view showing a member such as a stiffener with an end, which is bent a little by a press, etc.;

FIG. 24 is a cross-sectional view showing a cutting position of a member such as a stiffener with an end, which is bent a little by a press, etc.;

FIG. 25 is a cross-sectional view showing a member such as a stiffener with an end, which is bent a little by a press, etc., and which is subjected to edge preparation;

FIG. 26 is a cross-sectional view showing a joint when members, each having an end bent by a press and the same plate thickness, are abutted and welded;

FIG. 27 is a cross-sectional view showing a joint when members, each having an end face bent by a press and a different plate thickness, are abutted and welded;

FIG. 28 is a cross-sectional view showing a formation of weld reinforcement for a final layer according to the present invention with respect to the joint of a conventional method in which no tack welding is performed to the backing metal;

FIG. 29 is a cross-sectional view showing a formation of weld reinforcement for a final layer according to the present invention with respect to the joint of a conventional method in which tack welding is performed to the backing metal;

FIG. 30 is a cross-sectional view showing an application example of improvement of forming weld reinforcement according to the present invention in butt welding between a beam connection diaphragm and a beam flange;

FIG. 31 is a cross-sectional view showing steel structure welding wherein a square pipe is welded to a diaphragm;

FIG. 32 is a cross-sectional view showing a state in which two-pass overlay welding is performed with respect to an end to be welded, and both the end and the overlay weld are cut;

FIG. 33 is a cross-sectional view showing a state in which two-pass overlay welding is performed with respect to an end to be welded, and both the end and the overlay weld are subjected to edge preparation;

FIG. 34 is a cross-sectional view showing one example of assembly of butt joint of square steel or circular steel columns set up vertically according to the present invention;

FIG. 35 is a cross-sectional view showing one example of welding process of butt joint of square steel or circular steel columns set up vertically according to the present invention;

FIG. 36 is a view showing an example of a weld of a column to diaphragm of a structure connection and a weld of a diaphragm to beam with non-scallop when a back face of the end of a square steel pipe and a back face of the end of an H shape steel are subjected to overly welding;

FIG. 37 is a cross-sectional view showing a state in which an end of a member is overlay welded and both the end and an overlay weld are subjected to edge preparation with a curved surface;

FIG. 38 is a view showing an example in which members bent by a press are applied to the column and beam joint using an H shape steel for column connection and welding is performed;

FIG. 39 is a cross-sectional view showing an example of a conventional joint shape with backing metal before one-side welding is performed;

FIG. 40 is a cross-sectional view showing an example of a conventional joint with backing metal after one-side welding is performed;

FIG. 41 is a cross-sectional view showing a one-side welding method in which the surface position to be welded of a diaphragm is subjected to overlay welding in advance, and T-joint members are subjected to uranami welding from one side;

FIG. 42 is a cross-sectional view showing a one-side welding method in which overlay welding is provided to both the surface of a member to be welded such as a diaphragm and the back face of the end of the square steel pipe subjected to edge preparation, and T-joint members are subjected to uranami welding from one side;

FIG. 43 is an execution example in which steel end tabs are attached to the groove end according to the conventional method of column-beam joint;

FIG. 44 is a cross-sectional view of a formation of weld reinforcement by the conventional method in which no tack welding is performed to the backing metal, according to the requirement the Japan Architectural Standard Specification;

FIG. 45 is a cross-sectional view of a formation of weld reinforcement by the conventional method in which tack welding is performed to the backing metal according to the requirement the Japan Architectural Standard Specification;

FIG. 46 is a cross-sectional view showing one example of assembly of butt joint of square steel or circular steel columns set up vertically using backing metal according to the conventional method;

FIG. 47 is a view showing an example of a column and a diaphragm at a structure connection and a diaphragm and a beam at a weld according to the conventional method;

FIG. 48 is an outline view showing an example in which the joint of the H shape steel column and H shape steel beam using a dog born procedure is executed by the conventional welding method with a backing metal, and the overlay welding method or bending procedure of the present invention in the welding of the H shape steel column and stiffener at the connection for H shape steel is used; and FIG. 49 is an outline view when the overlay welding or bending procedure of the present invention is used in the welding of the H shape steel column and stiffener, and the welding of the H shape steel column and H shape steel beam using a dog born procedure at the connection for H shape steel is performed.

DETAILED DESCRIPTION OF THE PREFERRED EMBODIMENTS

Preferred embodiments of the present invention will be explained with reference to the drawings accompanying herewith.

FIGS. 1 to 4 show one embodiment of the present invention, and is an example in which the present invention is applied to a normal T-joint.

According to this embodiment, as shown in FIG. 1, non-metallic backing material 8 or water-cooled or non-water-cooled copper backing material 8 suffering no melting damage due to welding heat source, is placed to an end 2T of a member 2, and overlay wielding 9 is provided between the back face of the end 2T of the joint member and the backing material 8. Then, as shown in FIG. 2, the end of the member including an overlay weld is subjected to edge preparation. After that, the resultant is placed to an opponent's member face as shown in FIG. 3, and joint welding is performed thereto as shown in FIG. 4.

This eliminates the need for providing various work associated with the attachment of the backing metal unlike the conventional case shown in FIGS. 39 and 40, and makes it possible to carry out continuous work from edge preparation to joint welding. Namely, since this makes it possible to omit the backing metal, simplify the setting of members, use high welding current at the first layer and ensure the size accuracy of steel structure, a large reduction in the number of man-hours needed to produce the steel structure can be attained. At the same time, the production of backing metal after edge preparation and the off-line work process of attachment are omitted so that numerous joint welding is continuously performed. This allows a large reduction in the number of man-hours needed to produce the steel in view of the production processes and steps. Moreover, since the removal of harmful notches, the increase in the throat depth, and the ensuring of size accuracy of the steel structure can be attained, bending ductility, fatigue strength, and earthquake resisting strength can be easily ensured.

In this way, the number of man-hours needed to produce the steel structure is largely reduced by improvement in view of efficiency of the joint welding and that of the production processes and steps. This makes it possible to reduce the number of man-hours needed to production by about 30% in the joint of average plate thickness of 25 mm even if the number of man-hours needed to execute overlay welding is included.

In FIG. 4, the throat depth of joint is 2A in the case that the overlay welding 9 is not provided. However, if throat depth 1A of the joint obtained at the groove portion, which includes the overlay weld combined with the base metal, by the actual welding is referred to as a throat depth of the present invention, the throat depth of the joint is increased to 1A from 2A in the welding according to the present invention. According to the experiment, the cracks were generated at the root when a bending angle of the member 2 was 15 to 25° in the conventional joint shown in FIG. 40. By contrast, in the execution of work according to the present invention, it is assumed that the increase in the throat of the welding joint obtained by use of the same welding material as that of the member 1 is more than 10% of the member 2. In this case, even if the upward bending load 2B is applied on the member 2, generation of crack is little recognized and the member 2 is only bent since an angle at which the crack of member 2 is generated is 50 degrees or more. In other words, since the joint according to the present invention has the increase in the throat, the presence of a few unwelded portions at the root 9B of the joint weld 6 of FIG. 4 does not work as an adverse effect factor of stress concentration.

If stiffness is low such as a case in which the thickness of the member 1 is smaller than that of the member 2, uranami welding is provided to the root 9B of the joint weld of the present invention by horizontal welding. Moreover, if a weld of the member is exposed outside as in the H shape flange, welding is additionally provided to the root 9B or a grinder finish is given to the root 9B. This eliminates the stress concentration portion, so that fatigue strength of the joint can be further improved.

FIG. 31 is a view showing an example in which the one-side welding method according to this embodiment is applied to the joint between the square steel pipe column and the diaphragm at the steel structure connection.

In the conventional method, since the backing metal 3 is attached to the inner periphery of the square steel pipe to perform joint welding as shown in FIG. 47, the removal of a reinforcement of the longitudinal joint by producing the square steel pipe is needed to attach the backing metal. This requires much time and effort in attaching the backing metal for column, positioning the members, and tack welding, and a great number of man-hours needed to production are needed.

In the method according to the present invention, however, since overlay welding 9 is performed to the back face of the end of the square steel pipe beforehand as shown in FIG. 31, the square steel pipe 11 only has to be placed to the diaphragm 12. Whereby, the positional adjustment of the square steel pipe 11 to the diaphragm 12 can be easily carried out and the gap adjustment between the square steel pipe 11 and the diaphragm 12 and the tack welding become unnecessary. This allows joint welding 6 to be performed immediately without depending on the welding position. Though FIG. 31 shows the application to the square steel pipe, this can be applied to the circular steel pipe in the same way.

FIG. 32 is a view showing another embodiment of the present invention.

In this embodiment, the overlay welding 9 with a predetermined shape is provided to the back face of the member at a designed edge preparation location 15A, serving as an end of the joint member 2, in one to three passes. In this example, overlay welding is performed in two passes so as to obtain reinforcement larger than reinforcement obtained in one pass. Thereafter, both the member of the designed edge preparation location and the reinforcement weld metal are cut at the same angle as that of the face of the opponent's member. After cutting as in this example, edge preparation is provided to the member 2 including the overlay weld metal as shown in FIG. 2.

FIG. 33 is a view showing a modification of FIG. 32.

In this example, similar to FIG. 32, the overlay welding 9 is provided to the back face of the member at the designed edge preparation location 15A, serving as an end of the joint member 2, in two passes, which obtains reinforcement larger than reinforcement obtained in one pass. Thereafter, the resultant is cut at the same angle as the groove angle of the designed edge preparation location, and a cut face 15 obtained is used as a groove face as it is. In this way, a groove, which is larger than the case of one pass, can be obtained by performing overlay welding 9 in two passes. Thereafter, in a case where this is applied to the T-welding joint, the joint welding as shown in FIG. 4 is executed.

In addition, the size of the designed edge preparation location 15A in FIGS. 32 and 33 is normally 0 to 500 mm.

FIG. 46 is a cross-sectional view showing one example of assembly of butt joint of square steel or circular steel columns set up vertically according to the conventional method. At a joint welding preparation, since assembly and adjustment of inner side of pipes 16 and 17 and adjustment of a groove gap 16G are difficult to be carried out, a backing metal 18 and a stopper 19 are used at one joint in this example, and the backing metal 18 welded to the upper member 16 by tack welding 20 is inserted to the lower member 17 in a spigot-joint manner to welded the members to each other. Then, the groove gap is adjusted by the upper and lower positions of the backing metal 18, the long and short length thereof, and the upper and lower positions of the stopper 19. This conventional method needs a great number of man-hours needed to produce the backing plate and stopper and to perform correct attachment, has difficulty in adjustment because of variations in the product size accuracy of pipe.

FIG. 34 is a cross-sectional view showing one example of assembly of butt joint of square steel or circular steel columns set up vertically according to the method of the present invention. As is obvious from FIG. 34, even if there is a little misalignment between the members 16 and 17, the distance between the members 16 and 7 and the gap 16G can be maintained constant by only abutting both members against each other due to overlay 22 and 23. As shown in FIG. 35, full penetration and a throat depth 16B exceeding a plate thickness 16A of the member are easily ensured by the joint welding. In this case, if the throat depth that is comparable to the plate thickness 16A of the member is needed to be stably ensured, the overlay welding 22 of FIGS. 34 and 35 can be reduced or omitted.

This execution example can be easily applied to not only the building but also the stable welding from the exterior or interior of a pipeline or a water piping for electric generation, and is effective in ensuring strength and quality of the joint and reducing the number of man-hours needed to production.

FIG. 47 is a view showing an example of a joint between a diaphragm 12 and a square steel pipe column 11 at a steel structure connection and a joint between the diaphragm 12 and a H shape steel flange 26 according to the conventional method. In either of these joints, many backing metals 3 and tack welds 4 are used.

FIG. 36 shows a case in which the joint welding 6 is applied to the same joint as that of FIG. 47 in the method according to the present invention. FIG. 36 shows a state in which the present invention is applied to the welding of the diagram 12 to the square steel pipe 11, neither the backing metal nor the tack welding is provided, and penetration deeper than the plate thickness of the member 11 is obtained, and no harmful notch 7 of the conventional joint shown in FIG. 40 is formed. FIG. 47 shows a scallop what is called weld access hole 28, which is a large opening, the backing plate, and the tack welding 4 at the joint between the diaphragm 12 and the H shape steel flange 26. However, FIG. 36 shows a state, which is just before the joint welding 6 is executed after performing the overlay welding 9 at the joint between the diaphragm 12 and the H shape steel flange 26 by the method according to the present invention. A dotted line shows the joint welding 6 at the connection and a designed weld location 27A for a web without scallop. In this case, FIG. 36 illustrates a state in which neither the backing metal nor the tack welding for attaching the backing metal is provided, and penetration deeper than the plate thickness of the member 26 is obtained, no harmful notch 7 of the conventional joint shown in FIG. 40 is formed, and no scallop 28 shown in FIG. 47 is formed. Namely, in this embodiment according to the present invention, the welding portion of an H shape steel beam at a steel structure connection can be easily executed by a non-scallop procedure. In the example of the conventional method of FIG. 47, if the scallop 28 is eliminated, there are needed special contrivances, for example, two backing metals 3 are used at both sides of a web 27 separately. However, in this embodiment according to the present invention, neither the backing metal nor the scallop is needed, and this is excellent in the safety of joint and the reduction in the number of man-hours needed to production.

In the method of the present invention, as welding material to be used in the overlay welding 9 executed between the non-consumable backing material 8 and the joint end of the member 2, welding material with strength lower than that of the joint end face of the member 2 can be used. The use of such welding material ensures tensile strength and brings about relaxation of stress concentration by dispersion of plastic distortion so as to further help to improve bending ductility and fatigue strength as a welding joint.

In the method of the present invention, there is a case in which the welding joint members 1 and 2 are welded to each other as melting a groove surface 10 of the overlay weld metal of FIG. 3 from the front side of the groove as shown in FIG. 4. In this case, the use of welding material with strength lower than that of the welding joint members 1 and 2 can relax sensitivity of the crack generation at the root. Also, the use of welding material with strength higher than that of the welding joint members improves strength of the root. Either case is effective in more improving bending ductility and fatigue strength.

In the method of the present invention, at the time of performing edge preparation with the welding member 2 and the overlay welding 9 as shown in FIG. 37, edge preparation is provided to the groove surface 10 to form not a flat surface but a curved surface with a radius of curvature of 1 to 5 mm at a groove bottom 34. This expands the groove bottom 34 and is effective in obtaining deep penetration at the root of the joint welding 6 shown in FIG. 4 more easily.

In a case where the present invention is applied to the square steel pipes each having a small diameter in the steel structure such as a building, as shown in FIG. 18, the backing material 8 such as copper, which is not melted by the welding heat source, is placed to the back face of the end of the member 2 to which the end face of the T-butt welding is welded, that is, placed to the inner side of the steel pipe. Then, the overlay welding 9 is carried out between the back face of the joint member 2 and the backing material. Thereafter, one-side welding is performed by the method for ensuring the throat depth 1A in the direction of plate thickness exceeding the plate thickness 2A of the member 2 to which end face is welded through the same steps as those of FIGS. 2 to 4. In this case, ceramics with high melting point, tungsten, carbon, graphite, and the like can be used in place of the backing material 8 such as copper shown in FIG. 18, which is not melted. In order to easily take out these backing metals from the interior of the square steel pipe as a divided form or miniaturize these backing metals, a method in which water cooling is performed to improve cooling efficiency may be possible. Moreover, there is a case in which a thin plate with the same metal as that of the member 2 is attached to the overlay welding side of the backing material 8 such as copper, which is not melted, as shown in FIG. 15 and the overlay welding 9 shown in FIG. 16 is carried out. Damage of the backing material 8 is reduced and wettability of the overlay weld metal and the thin plate is increased, making it possible to perform the overlay welding smoothly.

In a case where the present invention is applied to one-side butt welding of such as square steel pipes each having a small diameter, as shown in FIG. 18, the backing material 8 such as copper, which is not melted by the welding heat source, is placed to the back face of one or both ends of the butt joint member. Then, the overlay welding 9 is carried out between the back face of the end face 2T of the welding joint member and the backing material. Thereafter, one-side welding is performed by the method for ensuring the throat depth 1A in the direction of plate thickness exceeding the plate thickness 2A of the member 2 to which end face is welded through the same steps as those of FIGS. 2 to 4. As a result, since the groove for overlaying is opened outside at the end of the square steel pipe with a small diameter, the execution of overlay welding can be easily performed even at the end of the square pipe with a small diameter. The execution method of the present invention can be applied to the circular steel pipe as well as the square steel pipe, and a case in which the butt joint members have different plate thickness or a large misalignment. In the case that the butt joint members have different plate thickness, overlay welding is provided to only the member with a thinner plate thickness from the inner face by the method according to the present invention, the end of the member with a thicker plate thickness is subjected to welding at a single bevel groove as being finished at the right angle. This makes it possible to carry out the execution method having joint strength and cost efficiency.

The backing material 8 such as copper, which is not melted by the arc heat, is placed to the back face of the longitudinal end of the member of the H shape steel flange to enclose the end of the flange as shown in FIG. 19A. Then, overlay welding is provided to the resultant including the side surface of the flange and edge preparation is performed to the member 2 including the overlay weld as shown in FIG. 13. Thereafter, joint welding is carried out, so that the joint weld can ensure the throat depth in the direction of the plate thickness exceeding the plate thickness of the flange 2 or the throat depth in the direction of the plate width exceeding the plate width. In a case where overlay welding is performed to the member 2 in a state of FIG. 19A, flat position welding is normally carried out, but horizontal position welding may be easily carried out. In this case, the backing material such as copper is further placed to the upper side of FIG. 19 and overlay wielding is executed, whereby facilitating the execution of the side face of the flange. The execution method according to the present invention allows concurrent use of the non-scallop procedure with no scallop 28 of FIG. 47 as shown in FIG. 36.

According to the present invention, as shown in FIG. 18, the backing material 8 such as copper, which is not melted by the welding heat source, is placed to the back face of the end of the member 2 to which the end of the T-welding joint is welded and the overlay welding 9 is carried out between the back face of the welding joint member 2 and the backing material. Particularly, this is extremely effective in the case in which the overlay welding is provided to the inner side of the narrow end of the square or circular steel pipe with a small diameter of less than 250 mm, as compared with the method in which the backing material 8 such as copper, which is not melted by the welding heat source, is placed to the end face of the larger member 2 to which the end of the T-welding joint is welded and the overlay welding 9 is carried out between the back face of the joint member 2 and the backing material as shown in FIG. 1.

In the present invention, after performing the overlay welding 9 shown in FIG. 18 or FIG. 19A, edge preparation of FIG. 2 including the overlay portion is performed to have a J groove in which a curved surface is formed on the groove bottom as shown in FIG. 37. This is effective in ensuring penetration of the first layer welding.

Though the press work shown in FIGS. 20 and 23 is carried out by cold work or hot work depending on the plate thickness or material, it is possible to use a method of molding the groove up to a predetermined groove shape by a forging process in place of a simple bending process. Also, this can be used as an inner diaphragm at the steel structure connection using the square steel pipes and circular steel pipes. In this case, if the end face of the diaphragm produced by the press is hit by a hammer and the like, the end face can be easily fit to the inner shape of the square steel pipe or the circular steel pipe.

FIG. 22 shows an example in which the groove is formed by the press and the stiffener 2 is butted and welded to the H shape steel flange 1. In such a joint, the back face is opened in most cases. The back face of the member 2 is gouged to be finished to a sound portion as required, the back face is simply finished to the sound portion by a grinder, or additional welding is provided to the back face by $CO_2$ gas shielded arc welding process, shielded metal arc welding process, or tungsten insert gas (TIG) gas welding process so that the back face can be smoothly finished.

FIG. 38 shows an example when the present invention is applied to the column and beam joint using the H shape steel for column connection. The member 1 is a column using the H shape steel, and a member 36 is a stiffener, which is fitted to the H shape steel column and welded thereto. Either of the welds 6, that is; one is between the column 1 and the stiffener 36 and the other is between the column and the beam, shows an example in which the end of the member 36 is bent and subjected to edge preparation to complete the joint welding. As shown in FIG. 38, in either weld 6, no backing metal is provided and the throat depth A1 in the direction of the plate thickness exceeding the plate thickness t of the member 36 is ensured, and harmful stress concentration resulting from the presence of backing metal is not generated. In addition, the same effect as mentioned above can be obtained even if the following process is performed in place of the bending process of the end of the member 36 in the execution example of FIG. 38. More specifically, overlay welding is provided to the back face of the end of the member 36 and the member 36 including the overlay weld is subjected to edge preparation as shown in FIG. 2 to carry out the joint weld 6.

Moreover, even in the butt welding of the members which are in the same plane, the end of the member 2 is subjected to bending process or cutting process in some instances to produce a groove face 2F by the procedure of FIG. 20 or the procedures of FIGS. 23, 24, and 25 with respect to the end of at least one member of the butt welding members. Thereafter, the joint members are opposed to each other and the welding joint members are butted and welded from the front side of the groove as shown in FIG. 26 or FIG. 27, whereby obtaining the throat depth 1A in the direction of the plate thickness exceeding the plate thickness t of thinner member 2. Even in such a joint, the back face is opened in most cases. The back faces of the members 1 and 2 are gouged to be finished to a sound portion as required, the back face is simply finished to the sound portion by a grinder, or additional welding is provided to the back face by $CO_2$ gas shielded arc welding process, shielded metal arc welding process, or tungsten insert gas (TIG) gas welding process so that the back face can be smoothly finished.

Additionally, in the present invention, the method, in which the overlay welding is provided to the back face of the end of the member and the back face including the overlay weld is subjected to edge preparation so as to carry out joint welding, can be widely applied to many joints in the wide range of the steel structure welding joint. The press process of the present invention shown in FIGS. 20 to 27 is effective in attaching the stiffener with a small size, a light weight and simple handling to the H shape steel in view of ease of press process.

Furthermore, in the present invention, edge preparation, which is performed to have a J groove as shown in FIG. 37, is effective in ensuring penetration of the first layer welding.

FIG. 28 is a view showing further another embodiment of the present invention.

The method of this embodiment is the same as the conventional method in that the welding is sequentially performed from the first layer to the upper layer. The difference therebetween lies in that the width and height of the final layer of the joint weld 6 at the side of the member 2 to which the end is welded are larger than those of the conventional method. Namely, in the present invention, at the side of the member 2 to which the end is welded, welding is performed such that a position 6T of a weld bead toe of the front side is placed to be separated from a position 7 of the welding root of the back face by more than 80% of the plate thickness t of the member of 2A, preferably, to be separated from the plate thickness t of the member of 2A by 1.5 t, that is, $6B \geq 0.8$ t, preferably, $t \leq 6B \leq 1.5$ t in FIG. 28. Moreover, welding is performed such that reinforcement height of the front bead in the entire area of the welding bead width of at least back face and reinforcement height 6H of the front bead at the welding root of the back face are ensured by at least more than 10% of the plate thickness t, preferably more than 15% to less than 25%. Furthermore, welding is performed such that reinforcement height of the final layer of the joint weld 6 is smoothly changed from the base metal surface of the joint welding member 1 to the member 2. In this way, the wide and high final layer can be attained by weaving the welding bead of the final layer or increasing the number of passes.

According to the experiment, regarding the 400 MPa and 500 MPa class steel materials having thickness of 20 mm and 30 mm, the crack was normally generated at the root when the member 2 was bent at the bending angle of 10 to 30° by bending moment 2B in the conventional joint shown in FIG. 44. In the joint of FIG. 28 according to the present invention, no crack was generated even if the member 2 was bent at the angle of more than 60°. Also, when the method according to the present invention was applied to the joint using the back face overlaying method of FIG. 4 similarly, the crack was little generated even if the member 2 was bent at the angle of more than 90° by bending moment 2B in most cases. In any of these bending tests, the bending portion was the base material. Furthermore, when the tensile test was executed using the same steel material, the crack or rupture occurred at the notch 7 of the root in most cases in the joint of the conventional method shown in FIG. 44. However, when the tensile load 2C was given by the method according to the present invention shown in FIG. 28, not the weld but the base metal was ruptured and original strength of the base metal was ensured. When the method according to the present invention as shown in FIG. 29 was applied to the conventional joint shown in FIG. 45, improvement of bending ductility and the rapture of the base metal against the tensile load were similarly obtained.

There is a case in which one-side welding is carried out by the method of the present invention in the butt welding joint of the diaphragm 12 and the flange 2 wherein two members to be welded are in the same plane according to the conventional method using the backing metal. As shown in FIG. 28, the final layer is widely welded, making it possible to improve joint strength and ductility. Namely, as shown in FIG. 31, the connecting using the square steel pipe 11 and the diaphragm 12 is produced by the process based on the back face overlay welding method of FIGS. 2 to 4. Then, as shown in FIG. 30, in the butt welding joint of the diaphragm 12 and the flange 2 according to the conventional method using the backing metal, the final layer is finished by 1-pass weaving weld or multi-pass weld. At that time, welding is preferably performed such that the final layer of the joint welding is set to $t \leq 6B \leq 1.5$ t and such that reinforcement height of the front bead in the entire area of the welding bead width of at least front face is ensured by more than 15% to less than 25%. Moreover, in case that one-side welding is performed in the butt welding joint wherein the connection is produced by the overlay welding method of the present invention as shown in FIG. 31 and two members are in substantially the same plane, as shown in FIG. 18 or FIG. 19A, the backing material such as copper, which is not melted by arc heat, is placed to the back face of the H shape steel flange and the overlay welding is provided thereto in advance, and edge preparation including the overlay portion is performed. Thereafter, the joint welding between members 12 and 16 is performed as shown in FIG. 36. Moreover, by the method of the present invention, welding is performed such that the final layer of the joint welding 6 is set to $t \leq 6B \leq 1.5$ t and such that reinforcement height of the front bead in the entire area of the welding bead width of at least front face is ensured by more than 15% to less than 25%. Then, as shown in FIG. 36, non-scallop welding 27A can be executed.

In addition, the execution method of the present invention reduces stress concentration and brings about improvement of bending ductility and joint property with respect to the conventional T-joint with the backing metal that causes stress concentration. This is helpful to improve bending ductility and joint strength in the application to the known steel structure.

Still moreover, in a case where the various methods according to the present invention are used in the welding portion between the building connection and the H shape steel beam, the connecting portion is strengthened and buckling is generated at the beam without breaking the connecting portion when the bending load is added to the beam with respect to the earthquake force.

Namely, FIG. 48 is an outline view showing an example in which the joint of the H shape steel column and H shape steel beam using a dog born procedure 35 is executed by the conventional welding execution method with a backing metal by use of the overlay welding method and bending procedure of the present invention in the welding of the H shape steel column stiffener 36 at the connection for H shape steel. In the dog born joint 35 in which the H shape steel beam flange 26 as shown in FIG. 48 is partially cut and notched, when the bending load is applied to the H shape steel beam, the buckling occurs at the notched beam instead of the fact that the column and beam joint is not broken. Therefore, this may be safe in view of the building as compared with the conventional welding joint wherein the backing metal 3 and scallop 28 exist and no dog born joint 35 is provided. However, since the joint of the present invention has high strength, the method of the present invention has a feature in which the joint with no notch in the flange 26 has higher strength. Moreover, from the viewpoint of cost, the method of the present invention has a feature in which no notch process is provided in the flange 26 and production cost is low as compared with the dog born procedure.

FIG. 49 is an outline view when the overlay welding method and bending procedure of the present invention are used in the welding of the H shape steel column stiffener and the welding of the H shape steel column and H shape steel beam using a dog born procedure at the connection for H shape steel. The execution method of the present invention can be applied to the joint without being contradictory to the dog born procedure. However, the use of the method of the present invention eliminates the need for using the dog born procedure 35 that reduces strength and increases production cost since buckling occurs at the beam flange 26, if no dog born 35 is provided.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A one-side welding method in a steel structure, said method comprising the steps of:

placing a backing material, which is not melted by a welding heat source, to an end face of a T-welding joint member, or one end face of butt welding members where two members are in substantially the same plane or both end faces;

performing overlay welding between a back face of the end of the member and said backing material;

providing edge preparation to the end of the member including said overlay weld metal; and welding the joint members to each other after being opposed to other as melting a groove face consisting of the overlay weld metal and the members from a front side of the groove, whereby ensuring a welding throat depth in the direction of a plate thickness exceeding a plate thickness of the end of the member of the welding joint.

2. A one-side welding method comprising the steps of:

providing overlay welding to a back face of the member at a designed edge preparation location, serving as an end of a joint member;

cutting both a member of the designed edge preparation location and said overlay weld metal for edge preparation; and welding the joint members to each other after being opposed to each other as melting a groove face consisting of the overlay weld metal and the members from a front side of the groove, whereby ensuring a welding throat depth in the direction of a plate thickness exceeding a plate thickness of the end of the member of the welding joint.

3. A one-side welding method when overlay welding is performed between a back face including side face at the end of the member of the steel plate with a finite width and said backing material by the method described in claim 1, said method comprising the steps of;

performing edge preparation to the end of the member including the overlay weld metal of the steel plate back face and that of the steel plate side face after performing the overlay welding to the back face and side face of steel plate member; and welding the joint members to each other after being opposed to each other as melting a groove face of the overlay weld metal and the member from a front side of the groove, whereby ensuring a throat depth in the direction of a plate thickness exceeding a plate thickness at the end of the member of the welding joint, or a throat depth in the direction of a plate width exceeding a plate width, or a throat depth in the directions of the plate thickness and plate width exceeding both plate thickness and plate width.

4. A one-side welding method when overlay welding is provided to a back face and a side face of the member at a designed edge preparation location, serving as an end portion of a joint member with a finite width by the method described in claim 2, said method comprising the steps of;

performing edge preparation to the member including the overlay weld metal of the steel plate back face and that of the steel side face after performing overlay welding to the back face and side face of the steel plate member at the designed location; and welding the joint members to each other after being opposed to each other as melting a groove face of the overlay weld metal from a front side of the groove, whereby ensuring a throat depth in the direction of a plate thickness exceeding a plate thickness at the end of the member of the welding joint, or a throat depth in the direction of a plate width exceeding a plate width, or a throat depth in the directions of the plate thickness and plate width exceeding both plate depth and plate width.

5. A one-side welding method when overlay welding is performed between a back face of the end of the member and said backing material by the method described in claim 1, said method comprising the steps of:

placing a thin steel plate of the same material as the joint member between the backing material, which is not melted by a welding heat source and the end face of the member;

performing overlay welding as melting said thin steel plate between a back face of the end of the member and said backing material;

performing edge preparation to the end of the member including said overlay weld metal; and welding the joint members to each other after being opposed to each other as melting a groove face of the overlay weld metal and the member from a front side of the groove, whereby ensuring a throat depth in the direction of a plate thickness exceeding a plate thickness of the member.

6. A one-side welding method when overlay welding is performed between a back face including side face of the member and said backing material by the method described in claim 3, said method comprising the steps of:

placing a thin steel plate of the same material as the joint member between the backing material, which is not melted by a welding heat source and the end face of the member;

performing overlay welding as melting said thin steel plate;

performing edge preparation to the end of the member including said overlay weld metal; and welding the joint members to each other after being opposed to each other as melting a groove face of the overlay weld metal and the member from a front side of the groove, whereby ensuring a throat depth in the direction of a plate thickness exceeding a plate thickness of the member, or a throat depth in the direction of a plate width exceeding a plate width, or a throat depth exceeding both throat depths in the directions of the plate thickness and plate width.

7. A one-side welding method in a steel structure, said method comprising the steps of:

placing a backing material, which is not melted by a welding heat source, to an end face of a T-welding joint member subjected to edge preparation, or at least one end face of butt welding members subjected to edge preparation where two members are in substantially the same plane or both end faces;

performing overlay welding between a back face including side face, as the case may be, of the member and said backing member; and welding the joint members to each other after being opposed to each other as melting a groove face of the overlay weld metal and the member from a front side of the groove, whereby ensuring a throat depth in the direction of a plate thickness exceeding a plate thickness of the member, or a throat depth in the direction of a plate width exceeding a plate width, or a throat depth exceeding both throat depths in the directions of the plate thickness and plate width.

8. A one-side welding method in a steel structure, said method comprising the steps of:

placing a backing material, which is not melted by a welding heat source, to the back face or the side face of a member whose end face of a T-welding joint member is to be welded, or at least one end of butt welding members where two members to be welded are in substantially the same plane or both end faces;

performing overlay welding between a back face of the end of the member and said backing material;

performing edge preparation to the member including said overlay weld metal; and welding the joint members to each other after being opposed to each other as melting a groove face of the overlay weld metal and the member from one side, whereby ensuring a throat depth in the direction of a plate thickness exceeding a plate thickness of the member whose end face is welded, or a throat depth in the direction of a plate width exceeding a plate.

9. A one-side welding method in a steel structure, said method comprising the steps of:

performing a bending process to an end of the member of a T-butt welding joint or at least one end of butt joint members, which are in the same plane, to use an outer face of the bend-processed end as a groove face or produce a groove face with a groove depth more than a plate thickness of the bend-processed material by providing a mechanical or thermal cutting process to the bend-processed end; and welding the joint members from a front side of the groove after being opposed to each other, whereby ensuring a throat depth in the direction of a plate thickness exceeding a plate thickness of the bend-processed member.

10. A method for performing one-side welding wherein when said one-side welding is performed with respect to a T-butt welding joint where an end face of one member is placed on a surface of other member to form a T shape substantially right-angled in a steel structure, welding is performed on the member whose end face is welded such that a position of a weld bead toe at a final welding layer of the front side is placed to be separated from a welding root on the back side or a tack weld toe of the backing metal by more than 80% of the plate thickness of the member on the front side surface and that reinforcement height of the front bead in the area of the welding bead width on the back side is ensured by at least more than 10% of the plate thickness so that reinforcement height is smoothly changed from a base metal surface, or when said one-side welding is performed with respect to a butt welding joint where two members to be welded are in substantially the same plane, welding of a final layer is performed on at least thinner plate side of two members such that the position of a weld bead toe at a final welding layer of the front side is placed to be separated from a welding root on the back side or the weld toe of the backing metal by more than 80% of the plate thickness of the member on the front side and that reinforcement height of the front bead in the area of the welding bead width on the back side is ensured by more than 10% of the plate thickness so that reinforcement height is smoothly changed from the base metal surface.

* * * * *